(12) United States Patent
Cussler et al.

(10) Patent No.: US 11,548,789 B2
(45) Date of Patent: Jan. 10, 2023

(54) STABLE AMMONIA ABSORBENTS

(71) Applicant: REGENTS OF THE UNIVERSITY OF MINNESOTA, Minneapolis, MN (US)

(72) Inventors: Edward Cussler, Minneapolis, MN (US); Alon McCormick, Minneapolis, MN (US); Mohammadmahdi Malmali, Minneapolis, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 79 days.

(21) Appl. No.: 16/759,950

(22) PCT Filed: Nov. 2, 2018

(86) PCT No.: PCT/US2018/059009
§ 371 (c)(1),
(2) Date: Apr. 28, 2020

(87) PCT Pub. No.: WO2019/090115
PCT Pub. Date: May 9, 2019

(65) Prior Publication Data
US 2020/0339434 A1 Oct. 29, 2020

Related U.S. Application Data

(60) Provisional application No. 62/675,827, filed on May 24, 2018, provisional application No. 62/580,718, filed on Nov. 2, 2017.

(51) Int. Cl.
| | | |
|---|---|---|
| C01C 1/04 | (2006.01) | |
| B01J 20/18 | (2006.01) | |
| B01J 20/10 | (2006.01) | |
| B01J 20/04 | (2006.01) | |
| B01D 53/04 | (2006.01) | |

(52) U.S. Cl.
CPC ........ *C01C 1/0458* (2013.01); *B01D 53/0438* (2013.01); *B01D 53/0454* (2013.01); *B01J 20/046* (2013.01); *B01J 20/103* (2013.01); *B01J 20/18* (2013.01); *C01C 1/0417* (2013.01); *B01D 2253/112* (2013.01); *B01D 2257/406* (2013.01)

(58) Field of Classification Search
CPC .......... B01D 2251/108; B01D 53/0462; B01D 2251/40; B01D 2251/404; B01D 2251/402; B01D 2251/406; B01D 53/0438; B01D 2253/112; B01D 2257/406; B01D 53/0454; B01D 53/58; B01D 53/02; B01D 53/047; B01J 20/103; B01J 20/3204; B01J 20/3483; B01J 20/3433; B01J 20/046; B01J 20/18; B01J 20/3236; C01C 1/0458; C01C 1/0417; C01C 1/0405; Y02P 20/52; Y02A 50/20
See application file for complete search history.

(56) References Cited

U.S. PATENT DOCUMENTS

| | | | |
|---|---|---|---|
| 4,148,866 A | 4/1979 | Becker | |
| 4,822,586 A * | 4/1989 | Shannahan | ............... B01J 8/388 423/359 |
| 2011/0243828 A1* | 10/2011 | Gordon | ................. C01C 1/0411 423/360 |
| 2015/0125377 A1 | 5/2015 | Himstedt | |
| 2017/0152149 A1 | 6/2017 | Malmali | |

OTHER PUBLICATIONS

Afshar, R. et al. Thermal conductivity of gaseous ammonia in the temperature range 358-925 K, Chemical Engineering Communications 1981, 10, 1-11, DOI 10.1080/00986448108910921.
Annable, D. Application of the temkin kinetic equation to ammonia synthesis in largescale reactors. Chem. Eng. Sci. 1952, 1, 145-196, DOI 10.1016/0009-2509(52)87011-3.
Aoki, T. et al. Activation on ammonia absorbing reaction for magnesium chloride. The Journal of Physical Chemistry C 2015. 119. 26296-26302, DOI 10.1021/acs.jpcc.5b07965.
Aoki, T. et al. Thermodynamics on Ammonia Absorption of Metal Halides and Borohydrides. J. Phys. Chem. C 2014, 118(32), 18412-18416.
Aribike, D.S. et al. Modeling of fixed bed adsorption of phenols on activated carbon, Theor. Found Chem Eng 2008, 42, 257-263, DOI 10.1134/S0040579508030056.
Aris, R. et al. Continuous lumping of nonlinear chemical kinetics, Chemical Engineering and Processing: Process Intensification 1989, 26, 63-69, DOI 10.1016/0255-2701(89)87007-2.
Aristov, Y. et al; Kinetics of water adsorption on silica Fuji Davison RD, Microporous and Mesoporous Materials 2006, 96, 65-71, DOI 10.1016/j.micromeso.2006.06.008.
Barpaga, D. et al. Functionalization of carbon silica composites with active metal sites for NH3 and SO2 adsorption. Microporous Mesoporous Mater. 2016, 221, 197-203.
Britt, D. et al. Metal-organic frameworks with high capacity and selectivity for harmful gases. Proc. Natl. Acad. Sci. U. S. A. 2008, 105 (33), 11623-11627.
Brown, T. "Ammonia production causes 1% of total global GHG emissions." Published Apr. 26, 2016. Accessed Jul. 9, 2020. https://ammoniaindustry.com/ammonia-production-causes-1-percent-of-total-global-ghg-emissions.

(Continued)

*Primary Examiner* — Timothy C Vanoy
(74) *Attorney, Agent, or Firm* — Quarles & Brady LLP

(57) ABSTRACT

The present disclosure relates to systems and methods of making ammonia using stable ammonia absorbents. The system and method for producing ammonia, comprises a reactor comprising a catalyst that converts at least a portion of nitrogen feed gas and at least a portion of hydrogen feed gas to ammonia (NH3) forming a reaction mixture comprising the ammonia, unreacted nitrogen, and unreacted hydrogen. An absorber configured to selectively absorb ammonia from the reaction mixture at a temperature of about 180 deg. C. to 330 deg. C. and a pressure of about 1-20 bar, the absorber comprising a solid absorbent. Preferably the solid absorbent is at least one metal halide and a solid support. The unabsorbed ammonium, the unreacted nitrogen, and unreacted hydrogen gas are recycled to the reactor.

32 Claims, 20 Drawing Sheets

(56) References Cited

OTHER PUBLICATIONS

Carling, R. Dissociation pressures and enthalpies of reaction in $MgCl_2$—$nH_2O$ and $CaCl_2 \cdot nNH_3$. J. Chem. Thermodynamics 1981, 13, 503-512, DOI 10.1016/0021-9614(81)90105-1.
Chakraborty, D. et al. Solid ammonia as energy carrier: Current status and future prospects. Fuel Cells Bull. 2009, 2009 (10), 12-15.
Christensen, C. H. et al. Metal ammine complexes for hydrogen storage. J. Mater. Chem. 2005, 15 (38), 4106-4108.
Cussler, E. et al. Ammonia Synthesis at Low Pressure. J. Vis. Exp. 2017, No. 126, e55691-e55691.
Doonan, C. J. et al., Exceptional Ammonia Uptake by a Covalent Organic Framework. Nat. Chem. 2010, 2 (3), 235-238. DOI: 10.1038/nchem.548.
Dyson, D. C. et al. Kinetic expression with diffusion correction for ammonia synthesis on industrial catalyst. Ind. Eng. Chem. Fundam. 1968, 7, 605-610, DOI DOI: 10.1021/i160028a013.
Elmoe, T. D. et al. A high-density ammonia storage/delivery system based on $Mg(NH_3)_6Cl_2$ for SCR-DeNOx in vehicles. Chem. Eng. Sci. 2006, 61 (8), 2618-2625.
Erisman, J. W. et al. How a century of ammonia synthesis changed the world. Nat. Geosci. 2008, 1 (10), 636-639.
Gonc-Alves, M. et al. Ammonia Removal Using Activated Carbons: Effect of the Surface Chemistry in Dry and Moist Conditions. Environ. Sci. Technol 2011, 45, 10605-10610.
Gordeeva, L. G. et al. Composites "binary salts in porous matrix" for adsorption heat transformation. Appl. Therm. Eng. 2013, 50 (2), 1633-1638.
Helminen, J. et al., Adsorption Equilibria of Ammonia Gas on Inorganic and Organic Sorbents at 298.15 K. J. Chem. Eng. Data 2001, 46 (2), 391-399. DOI: 10.1021/je000273+.
Horiuti, J. et al. The mechanism of catalyzed synthesis of ammonia in the presence of doubly promoted iron catalyst. J. Res. Inst. Catal., Hokkaido Univ. 1960, 170-187, DOI 10.1080/03602458108068066.
Huberty, M. S., et al. Ammonia absorption at haber process conditions. AIChE J. 2012, 58: 3526-3532, DOI 10.1002/aic.13744.
Hummelshøj, J. S et al. Generation of nanopores during desorption of $NH_3$ from $Mg(NH_3)_6Cl_2$. J. Am. Chem. Soc. 2006, 128 (1), 16-17.
International Searching Authority, International Search Report & Written Opinion for application PCT/US2018/059009. dated Jan. 22, 2019.
Jasuja, H. et al. Evaluation of Mofs for Air Purification and Air Quality Control Applications: Ammonia Removal from Air. Chem. Eng. Sci. 2015, 124, 118-124. DOI: 10.1016/j.ces.2014.08.050.
Johnson, S. R. et al. The Monoammoniate of Lithium Borohydride, $Li(NH_3)BH_4$?: An Effective Ammonia Storage Compound. Chem.—An Asian J. 2009, 4 (6), 849-854.
Klerke, A. et al. Ammonia for hydrogen storage: challenges and opportunities. J. Mater. Chem. 2008, 18 (20), 2304-2310.
Liu, C. Y. et al. Ammonia Absorption on Alkaline Earth Halides as Ammonia Separation and Storage Procedure. Bull. Chem. Soc. Jpn. 2004, 77 (1), 123-131.
Malmali, M. et al. Ammonia Synthesis at Reduced Pressure via Reactive Separation. Ind. Eng. Chem. Res. 2016, 55 (33), 8922-8932.
Malmali, M. et al. Better absorbents for ammonia separation. 2018 ACS Sustainable Chem. Eng, DOI 10.1021/acssuschemeng.7b04684.
Malmali, M. et al. Converting Wind Energy to Ammonia at Lower Pressure. ACS Sustainable Chem. Eng. 2017. DOI: 10.1021/acssuschemeng.7b03159.
Marcussen, L. The kinetics of water adsorption on porous alumina, Chemical Engineering Science 1970, 25, 1487-1499, DOI 10.1016/0009-2509(70)85070-9.
Neveu, P. et al. Solid-gas chemical heat pumps: Field of application and performance of the internal heat of reaction recovery process. Heat Recovery Systems and CHP 1993, 13, 233-251, DOI 10.1016/0890-4332(93)90014-M.
Paulik, J. et al. Thermogravimetric Examination of the Dehydration Process of Calcium Bromide Hydrate under Quasi Isothermal and Quasi Isobaric Conditions. Thermochim. Acta 1979, 31 (1), 93-100. DOI: 10.1016/0040-6031(79) 80012-x.
Pontiroli, D. et al. Ammonia-storage in lithium intercalated fullerides. J. Mater. Chem. A 2015, 3 (42), 21099-21105.
Reese, M. et al. Performance of a Small-Scale Haber Process. Ind. Eng. Chem. Res. 2016, 55 (13), 3742-3750.
Sharonov, V. E. et al. Ammonia adsorption by $MgCl_2$, $CaCl_2$ and $BaCl_2$ confined to porous alumina: The fixed bed adsorber. React. Kinet. Catal. Lett. 2005, 85 (1), 183-188.
Sharonov, V. E. et al. Ammonia sorption on composites "$CaCl_2$ in inorganic host matrix": isosteric chart and its performance. Int. J. Low-Carbon Technol. 2006, 1 (3), 191-200.
Smil, V. Detonator of the population explosion. Nature 1999, 400 (6743), 415-415.
Sorensen, R. Z. et al. Indirect, reversible high-density hydrogen storage in compact metal ammine salts. J. Am. Chem. Soc. 2008, 130 (27), 8660-8668.
Teixeira, A. et al. Dominance of surface barriers in molecular transport through silicalite-1, Journal of Physical Chemistry C 2013, 117, 25545-25555, DOI 10.1021/jp4089595.
Temkin, M. et al. Kinetics of ammonia synthesis on promoted catalysts. Acta Physiochim. USSR 1940, 12, 327-356.
Van Hassel, B. A. et al. Ammonia sorbent development for on-board $H_2$ purification. Sep. Purif. Technol. 2015, 142, 215-226.
Veselovskaya, J. V. et al. Novel ammonia sorbents "porous matrix modified by active salt" for adsorptive heat transformation: 1. Barium chloride in various matrices. Appl. Therm. Eng. 2010, 30 (6), 584-589.
Wagner, K. et al. Column absorption for reproducible cyclic separation in small scale ammonia synthesis. AIChE J. 2017, 63 (7), 3058-3068.
Worrell, E. et al. Energy Use and Energy Intensity of the U.S. Chemical Industry; LBNL-44314; Lawrence Berkeley National Laboratory: Berkeley, CA, 2000.
Zamfirescu, C. et al. Ammonia as a green fuel and hydrogen source for vehicular applications. Fuel Process. Technol. 2009, 90 (5), 729-737.
Nielsen, A. et al. "Rate equation and mechanism of ammonia synthesis at industrial conditions." Journal of Catalysis 3.1 (1964): 68-79.

* cited by examiner

STABLE AMMONIA ABSORBENTS

CROSS REFERENCE TO RELATED APPLICATIONS

This application is a U.S. National Stage of PCT Application No. PCT/US2018/059009 filed on Nov. 2, 2018 which claims priority to U.S. Provisional Application No. 62/580,718, filed on Nov. 2, 2017 and U.S. Provisional Application No. 62/675,827, filed on May 24, 2018, the contents of which are incorporated by reference in their entireties.

STATEMENT REGARDING FEDERALLY SPONSORED RESEARCH OR DEVELOPMENT

This invention was made with Government support under contract number DE-AR0000804 awarded by DOE, Office of ARPA-E. The Government has certain rights in this invention.

BACKGROUND

The field of the invention is systems and methods of making ammonia. More particularly, the invention relates to methods of making ammonia using stable ammonia absorbents that require less capital and energy to produce ammonia.

Ammonia is one of the most important chemicals in the world, the key to the green Revolution. Without synthetic ammonia, about two billion of the world's population would starve. The ammonia is almost entirely produced by the Haber-Bosch process, carefully optimized by a century of effort. This catalytic process produces a mixture of hydrogen, nitrogen, and carbon dioxide by burning fossil fuels with air and water. After the carbon dioxide is removed, the hydrogen and nitrogen are reacted at around 400° C. and 150 bar. The high temperature is needed to break the strong nitrogen bond, and the high pressure is used to drive the reaction towards higher conversion. Conventionally, the ammonia is separated by condensation, and the unreacted hydrogen and nitrogen are reheated and recycled to the reactor. The process works well, and is a mainstay of commodity chemical manufacture.

However, the process does have disadvantages. It requires fossil fuels, and is by itself responsible for about 2-3% of global carbon dioxide emissions. The high pressure and high temperature required mean that capital expenses are large, which can limit production in developing countries. These disadvantages to the current process are serious enough to sustain continuing research, especially for new catalyst recipes. Accordingly, there remains a need in the art for improved methods of producing ammonia.

SUMMARY

The present invention overcomes the aforementioned drawbacks by providing new ammonia solid absorbents that can be used in systems and methods of separating ammonia that require less energy as they require lower pressures than the conventional processes. The preparation and operation of suitable solid absorbents are described.

In one aspect, the disclosure provides a system for producing ammonia, the system comprising: (a) a reactor comprising a catalyst that converts at least a portion of nitrogen feed gas and at least a portion of hydrogen feed gas to ammonia ($NH_3$) forming a reaction mixture comprising the ammonia, unreacted nitrogen, and unreacted hydrogen; (b) an absorber configured to selectively absorb ammonia from the reaction mixture at a temperature of about 180° C. to 330° C. and a pressure of about 1-20 bar, the absorber comprising a solid absorbent, the solid absorbent comprising at least one metal halide and a solid support; and (c) a recycle line to recycle unabsorbed ammonium, the unreacted nitrogen, and unreacted hydrogen gas to the reactor.

In some aspects, the solid absorbent comprises at least one metal halide selected from the group consisting of $MgCl_2$, $CaCl_2$, $MgBr_2$, $CaBr_2$, $MgClBr$, $CaClBr$, and $MgCaBr$.

In some aspects, the solid absorbent comprises a solid support selected from silica and zeolite.

In further aspects, the absorption phase comprises a temperature of about 180° C. to 300° C. within the absorber and a pressure from about 1 to about 50 bar, preferably about 1-10 bar, alternatively about 1 to about 5 bar.

In another aspect, the present disclosure provides a method of producing ammonia, the method comprising (a) reacting a nitrogen feed gas and a hydrogen feed gas in the presence of a catalyst in a reactor to form ammonia ($NH_3$), wherein the reaction produces a reaction mixture comprising ammonia gas, unreacted nitrogen and unreacted hydrogen, (b) selectively absorbing the ammonia from the reaction mixture in an absorber at a temperature of about 180-330° C. and a pressure of about 1-10 bar, the absorber comprising a solid absorbent, the solid absorbent comprising at least one metal halide and a solid support; and (c) collecting the ammonia absorbed by the absorber into an ammonia product stream.

The foregoing and other aspects and advantages of the invention will appear from the following description. In the description, reference is made to the accompanying drawings which form a part hereof, and in which there are shown, by way of illustration, preferred embodiments of the invention. Such embodiments do not necessarily represent the full scope of the invention, however, and reference is made therefore to the claims and herein for interpreting the scope of the invention.

BRIEF DESCRIPTION OF THE DRAWINGS

The present invention will be better understood and features, aspects, and advantages other than those set forth above will become apparent when consideration is given to the following detailed description thereof. Such detailed description makes reference to the following drawings, wherein.

DETAILED DESCRIPTION

Figure 1:
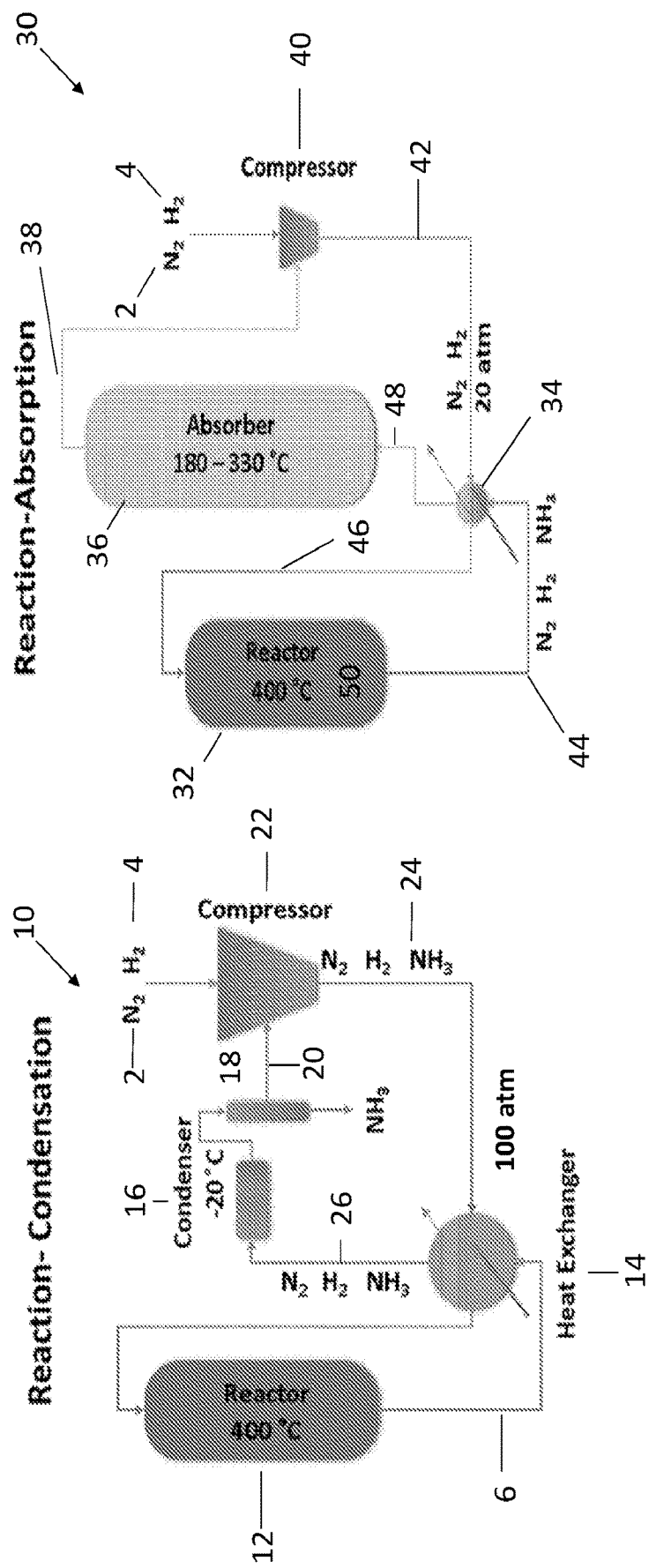
FIG. 1. Conventional vs. Absorption-Based Ammonia Synthesis. In the conventional system, the ammonia produced is separated by condensation. In the modified process, it is removed by absorption.

The present disclosure provides stable solid absorbents that can be used in systems and methods for producing ammonia. These stable solid absorbents can be used in systems and methods that require a lower operating pressure than the standard Haber-Bosch process or other methods currently used for ammonia production. In addition to having improved stability relative to conventional solid ammonia absorbents, the stable solid absorbents described herein exhibit advantageous properties including increased rates of absorption and regeneration. The stable solid absorbents can provide economical small-scale production allowing for the reduction in the energy needed to carry out the process. This energy can come from several sources including, without limitation, wind and fossil fuels.

The methods and systems described in this disclosure provide an absorber comprising a solid absorbent. As used herein, the term "absorbent" refers to materials having capacity to take up a target species into the material. "Absorbents" or "solid absorbents" refer to and encompass salts such as metal halide salts, and salts plus a solid support. Preferably, solid absorbent described herein comprise, consist of, or consist essentially of a metal halide and a solid support. The combination of the metal halide and solid support forms a solid absorbent capable of increased absorption of ammonia as compared with the metal halide alone as demonstrated in Table 2. The ratio of the metal halide (e.g., $MgCl_2$, $CaCl_2$, $MgBr_2$, $CaBr_2$, $MgClBr$, $CaClBr$, or $MgCaBr$) and solid support (e.g., silica (Si), zeolite (Ze)) is formulated to provide a stable absorbent that has an increased ability to absorb and produce ammonia at lower working pressures. The use of the solid absorbents also reduces the need for reducing the temperature between the reactor and the absorber. This is unlike conventional systems that require a larger temperature shift to condense the ammonia from gas to liquid form (e.g., a temperature shift from 400° C. to less than 60° C. to allow for condensation of the ammonia in a condenser) to produce an ammonia product.

The solid absorbents described herein selectively absorb ammonia ($NH_3$) and do not absorb (or absorb low levels of) the unreacted hydrogen gas ($H_2$) or unreacted nitrogen gas ($N_2$) that may be in the reaction mixture. As used herein, the term "absorb" refers to taking up a target species into a solid (e.g., a crystal salt or crystal salt in combination with a solid support). In some cases, absorption is selective. The term "selectively absorb," "selective absorption," "selective absorption affinity," or similar terms are used herein to refer to an absorbent having an affinity for one compound over another, in this case for $NH_3$ product gas over $H_2$ or $N_2$ gas.

Selective absorption of $NH_3$ with an absorbent refers to absorbing a substantially higher proportion of $NH_3$ present from the reaction product mixture into the absorbent while letting substantially higher proportion of the $H_2$ or $N_2$ gas pass through or by the absorbent. The absorbed ammonia can later be easily and rapidly released from the solid absorbent. As used herein, the term "release" refers to desorption of ammonia or another species after absorption. The term release is used to distinguish the process of desorption following adsorption, which refers to uptake of a target species onto the surface of a solid (e.g., a solid surface made microporous to increase the available surface area). Suitable examples of methods of desorbing from the solid support would be understood by one skilled in the art, for example by simply increasing the temperature or lowering the pressure.

The term "absorption" refers to the take up of ammonia by salts or the combination of salts and a solid support. By this, we assert that ammonia molecules are going into the salt crystal and not just being retained on the crystal surface. The incorporation into the solid is responsible for the selectivity of the absorption; ammonia is absorbed but nitrogen and hydrogen gases are not. The absorption can take place even at temperatures over 300° C. and can exceed four moles of salt at lower temperatures. The process is much more like hydration, where the ammonia takes the place of water to form "ammoniates". The amount and the selectivity in these absorptions are much greater than those expected for adsorption, where the gas being separated adheres to the crystal surface and does not penetrate significantly into the solid. Example 1 demonstrates a preferred absorbent material for ammonia separation at high temperatures.

The system and methods of the present disclosure may use the stable absorbents of high capacity in combination with traditional ammonia synthesis catalysts to produce ammonia. For example, after ammonia is produced in a catalytic reactor, it can be selectively absorbed by the absorbent within the absorber, thus reducing the amount of free ammonia present and driving the reaction to a higher conversion percentage. Suitable systems and methods of using an absorber in which the stable solid absorbents described herein may be incorporated are described in U.S. patent application Ser. Nos. 14/535,491 and 15/432,236 by the inventors, the contents of which are incorporated herein by reference in their entireties.

Conventionally, both high temperature and higher pressure were required to increase the overall conversion of hydrogen and nitrogen gas to ammonia, and low temperature is needed to be able to withdraw the ammonia from the system in a liquid state. For example, the Haber-Bosch reaction operated at high temperatures (e.g., about 400° C. or above) and high pressure (at least about 130-300 bar), but the conversion and recover rate is low, around 15-20% of the hydrogen and nitrogen fed react to form ammonia using this process. Further, there is a need for a high temperature reduction via heat exchanger and condenser to condense the ammonia gas into liquid form (e.g. temperature drop from 400° C. to less than 60° C.). Operating at such high temperature and pressure adds cost to systems as compressors and systems parts (e.g., reaction vessels, seals, piping) able to produce and withstand these high pressures are more expensive. It also added cost to heat and cool the gases.

As described in the following paragraphs and Examples that follow, the incorporation of the stable solid absorbents described herein provides systems and methods for synthesis and collection of ammonia at lower operating temperatures and pressures relative to the conventional Haber-Bosch reaction. Further, the system and methods of the present disclosure can be used on a small scale. For example, a system in accordance with the present disclosure can be installed on or near a farm in which ammonia will be used as a fertilizer. In another example, the system can be used in connection with an isolated wind-energy production site, allowing for the wind-energy to be converted in to ammonia production that can then be used for either fertilizer or energy storage. These small-scale systems can therefore reduce or substantially eliminate fertilizer transportation costs, further reducing the energy requirements and the environmental impact of ammonia production.

Stable Solid Absorbent

The inventors have found that supported metal halides have superior ammonia absorption properties and improved stability as compared to bulk metal halides. These supported metal halide sorbents, herein referred to as solid absorbents, showed outstanding dynamic capacity with excellent reproducibility. The dynamic capacities of solid supported absorbent can be close to the expected thermodynamic capacity. Metal chlorides, metal bromides and their mixture along with 5 different supports (diatomaceous earth, kaolinite, alumina, silica, zeolite type Y) were studied. Among these supports, silica and zeolite Y were the most promising in providing improved capacity. Overall, cations having a smaller atomic number show more affinity to ammonia, with bromides exhibiting higher affinity for ammonia than chlorides. Different solvents used in preparing the supported materials and mixtures of metal halides on supports did not show significant changes in the sorption capacity.

In some embodiments, the metal halide is selected from the group consisting of $MgCl_2$, $CaCl_2$, $MgBr_2$, $CaBr_2$, MgClBr, CaClBr, and MgCaBr. Suitable examples of the metal halide-solid support compositions are shown in the Tables in the Examples below.

Suitable solid absorbents of the present invention are described in the examples below and include, without limitation, $MgCl_2$—Si, $CaCl_2$—Si, $MgBr_2$—Si, $CaBr_2$—Si, MgClBr—Si, CaClBr—Si, MgCaBr—Si, $MgCl_2$—Ze, $CaCl_2$—Ze, $MgBr_2$—Ze, $CaBr_2$—Ze, MgClBr—Ze, CaClBr—Ze, and MgCaBr—Ze. In some embodiments, the solid absorbents contain silica, for example, $MgCl_2$—Si or $MgBr_2$—Si.

As described in the examples below, the ratio of the metal halide to solid support may provide increased ammonia absorption when compared to the metal halide or the solid support alone. In particular, the examples demonstrate ratios and percentages of metal halide to solid support which yield high ammonia absorption.

For example, in one embodiment, the ratio of metal halide to salt is from about 15:1 to about 3:4. In some embodiments, the ratio is about 3:2.

In some embodiments, the percentage of salt contained within the solid absorbent is at least about 40%. In another embodiment, the salt contained within the solid absorbent is about 50%, alternatively from about 40% to about 60%. In some embodiments, the salt contained within the solid absorbent is about 40%, about 45%, about 50%, about 55%, or about 60%.

The capacity and stability of the solid absorbents are characterized herein by their sorbent capacity (mg $NH_3$/g sorbent) and their coordination number ($mol_{NH3}/mol_{salt}$). The solid absorbents of the present technology have large sorbent capacity and coordination numbers that provide increased ammonia absorbance and stability, as described in the examples.

The solid absorbents of the present invention in some embodiments have a sorbent capacity of at least 50 mg $NH_3$/g sorbent. In other embodiments, the solid absorbent has a sorbent capacity of at least 70 mg $NH_3$/g sorbent. In further embodiments, the solid absorbent has a sorbent capacity of at least 100 mg $NH_3$/g sorbent. In yet another embodiment, the solid absorbent has a sorbent capacity of at least 140 mg $NH_3$/g sorbent.

Further, in some embodiments, the solid absorbent has a coordination number of at least 0.5 $mol_{NH13}/mol_{salt}$. In other embodiments, the solid absorbent has a coordination number between about 0.5 and about 2 $mol_{NH3}/mol_{salt}$.

The solid absorbent may be formed into one or more beds within the absorber. Suitable beds or layers can be designed by one skilled in the art. In some embodiments, the solid absorbent 50 is contained completely within the absorber 36. In other embodiments, the solid absorbent is contained partially within the absorber 36. In other embodiments, the solid absorbent is contained within or connected with the reactor 32.

Systems

Two systems, illustrated in FIG. 1, are central to this work. The conventional Haber-Bosch process 10, shown on the left-hand side of the figure, is based on a reactor 12 and a condenser 16. The process advocated here 30, shown on the right-hand side of the figure, centers on a reactor 32 and a solid absorbent 50, which can be contained within the absorber 50 or can be contained within the reactor 32 (embodiment not shown). In both processes, nitrogen and hydrogen enter and are converted to ammonia. The difference is how the gases are separated after the reactor.

System 30 described herein uses an absorber which can provide conversion of hydrogen and nitrogen gases to ammonia at lower pressure. The ability to operate at much lower pressures and on a smaller scale can be particularly useful to provide a system 30 for on-site, on-demand production of ammonia.

The absorber-containing process 30, shown on the right-hand side of FIG. 1, includes a reactor 32 and a heat exchanger 34, but replaces the condenser 16 with an absorber 36 containing the solid absorbent 50. The use of a solid absorbent 50, which captures the ammonia in a solid crystal, is superior to the condenser 16 in two ways: it captures the ammonia at higher temperatures, and it is more selective.

The reactor 32 can be operated at conditions capable of providing for the conversion of $N_2$ 2 and $H_2$ 4 gas from the feed lines to $NH_3$. For example, the reactor 32 can be operated at typical Haber-Bosch temperatures, for example with a residence time of the $N_2$ feed 4 and/or the $H_2$ feed 6 of from about 1 second to about 20 seconds, a temperature of from about 350° C. to about 450° C., for example about 400° C. The reactor 32 can be run using a typical Haber-Bosch catalyst. In preferred examples, the system 30 of the present disclosure allows the reactor 32 to produce the same amount of ammonia per time at lower pressures (e.g., 1-50 bar, preferably 1-20 bar) than the conventional Haber-Bosch process 10. For example, the system 30 can be operated at a pressure of about 20 bar, compared to pressures of at least about 130 bar for conventional Haber-Bosch process. In fact, in some examples, the reactor of the system is operated at a pressure lower than 20 bar (e.g., about 1 bar, 2 bar, 5, bar, 10 bar, 15 bar, 18 bar, 19 bar).

At least a portion of the absorber exit stream 38 from the absorber 36 can be recycled back into the reactor 32, for example using a recirculation pump (not shown) along the recycle line 38. The removal of $NH_3$ from the reactor exit stream 44 via absorption into the solid absorbent, e.g., an $MgCl_2$-silica absorbent, can decrease the concentration of $NH_3$ in the recycle line 38, which can act to drive the forward reaction in 32 toward more $NH_3$. In an example, the recycle flow rate can be from about 10% and about 500% of the combined flow rate of the $N_2$ feed 2 and the $H_2$ feed 4, for example, about 50% or 100%. In a small-scale example, the flow rate of recycled gas in the recycle line 38 can be from about 0.25 standard liters per minute (SLPM) to about 10 SLPM.

The system 30 can operate by the following procedure: $N_2$ and $H_2$ are fed to the reactor 32, e.g., via the feed line 42, where they react, via a reaction catalyzed by the catalyst, to form $NH_3$. Unreacted $N_2$ and $H_2$ and produced $NH_3$ flow from the reactor 32 to the absorber 36, e.g., through the reactor exit stream 44, where at least a portion of the $NH_3$ can absorbed by the solid absorbent 50. The gases exiting the absorber 36, e.g., via the absorber exit stream/recycle line 38, can include unreacted $N_2$ and $H_2$ and unabsorbed $NH_3$, and can be recycled back to the reactor 32, such as via the recycle line 38. The gases can be allowed to substantially continuously flow and cycle through the system 30 for a period of time until the absorbent becomes substantially saturated with $NH_3$, or some smaller percentage, such as from about 50% to about 99% of the absorption capacity, for example from about 70% to about 95%, such as about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 99.5%, or about 99.9%. After the predetermined percentage of absorption capacity is reached, the gas feeds 2, 4 can be ceased, the recycle can be ceased, e.g., by shutting off the recirculation pump, and $NH_3$ can be desorbed from the solid absorbent by changing the temperature or pressure.

In one embodiment, a first temperature (e.g., a low temperature, for example, about 150° C. to about 400° C., preferably about 150° C. to about 300° C.) can be applied to the gas and the solid absorbent to allow the $NH_3$ to absorb into the solid absorbent, and a second temperature, e.g.,(a higher temperature (e.g., greater than 300° C. (for example, 300° C.-500° C.)) can be applied to the gas and the solid absorbent in the absorber in order to allow the $NH_3$ to desorb from the solid absorbent. As will be appreciated by a person of ordinary skill in the art, in some examples, it may be preferably to keep the pressure in the absorber that is contacting the solid absorbent 50 at a relatively constant pressure (e.g., 1-20 bar or 1-10 bar) and to control the absorption and desorption by controlling the temperature within the absorber.

In other examples, both the pressure and temperature can be used to affect absorption and desorption of $NH_3$. For example, the absorber 36 can be subjected to a first set of conditions selected to provide for absorption of the $NH_3$, and then the absorber 36 may be subjected to a second set of conditions selected to provide for desorption of the $NH_3$ from the solid absorbent.

In some examples, a substantial portion of the absorbed $NH_3$, such as all of or substantially all of the absorbed $NH_3$, is desorbed and released from the solid absorbent 50. In an example, the one or more desorption conditions can include a predetermined specified desorption pressure in the absorber 36 that is reduced compared to the absorption pressure applied during the absorption phase, or a predetermined specified desorption temperature that is increased compared to the absorption temperature applied to the absorbent 50 during the absorption phase, or both.

In one example, one or both of the heat exchanger 34 and the compressor 40 act on the feed gasses 2, 4, as shown in FIG. 1. The heat exchanger 34 can be controlled by a temperature control system to control the temperature of the feed gases entering the reactor 32 and/or controlling the temperature of the reaction mixture in reactor output 46 before it enters the absorber. In some embodiments, the temperature control system comprises a reactor temperature control system and an absorber temperature control system that control the temperature of the reactor and absorber, respectfully.

In another example, the system 30 can include an absorber temperature control system (not shown) an absorber pressure control system (not shown), or both, for controlling one or both of the temperature or the pressure that is applied to the absorbent in order to control absorption or desorption of $NH_3$ from the absorbent during operation of the system 30. As will be understood by a person of ordinary skill in the art, a temperature control system can include a temperature sensor (not shown) for measuring a temperature of the absorber 36 or the absorbent, such as by measuring an exit temperature at an absorber exit stream 38, and a temperature controller that can control a heater, a cooler, or both, (not shown) for controlling the temperature of the absorber 36, such as by controlling heating or cooling of the gas within the reactor. As will also be understood by a person of ordinary skill in the art, a pressure control system can include a pressure sensor (not shown) for measuring a pressure within the absorber 36, and a pressure controller that can control a compressor or pressure release (or both) for controlling the pressure within the absorber 36, such as by controlling the pressure of the gas entering the absorber 36 via the reactor exit stream 44.

Further, one or more pressure control systems are contemplated to control the temperature within the reactor 32 or the absorber 36. For example, a first reactor pressure control system may regulate the pressure within the reactor, and a second absorber pressure control system may regulate the pressure within the absorber. In another embodiment, one pressure control system may regulate the pressure of both the reactor and the absorber.

The combined production of $NH_3$ and subsequent absorption of the $NH_3$ can allow the system 30 to surpass typical equilibrium conversion values, which typically peak at about 15% for the Haber-Bosch process. In examples, the system 30 can provide for conversion to ammonia of at least about 50%, such as at least about 55%, for example at least about 60%, such as at least about 65%, for example as at least about 70%, such as at least about 75%, for example at least about 80%, such as at least about 85%, for example at least about 86%, 87%, 88%, 89%, 90%, 91%, 92%, 93%, 94%, or 95%. The system 30 of the present description can provide for conversion over 95%, such that the system 30 can provide for a conversion that is 5 times or more than that which has been typically possible in even the most efficient Haber-Bosch plants.

System 30 can be made on a small-scale installed on-site where the ammonia is to be used. This can essentially eliminate $NH_3$ transportation costs. Moreover, operation on the small scale of the system 30 can have much lower energy requirements than a Haber-Bosch plant. In addition, because of the high conversion, the $H_2$ feed gas can be provided via methods other than steam reforming of natural gas, further reducing the energy requirements of the system 30. For example, the $H_2$ feed 4 can be provided, for example, via electrolysis of water, which is not practical on very large scales, but which can be economically viable on small scales such as system 30. The $N_2$ feed 2 can be provided, for example, using pressure swing adsorption or selective membranes to separate nitrogen gas from air.

The flow rates, volumes, and other values described above with respect to the system 30 are not intended to be limiting and are simply added to provide context. The values can be scaled up or down by a person of skill in the art depending on the desired output of the system 30.

In an example, the system 30 is operated by a cyclical method comprising one or more cycles alternating between an absorption phase and a desorption phase. In an example, during the absorption phase, $N_2$ and $H_2$ are fed to the reactor 32, e.g., via the feed lines 2, 3 via 42/46, where they react to form $NH_3$, for example via a reaction catalyzed by the catalyst in the reactor 32, to form $NH_3$. The pressure of the $N_2$ feed 2 and the $H_2$ feed 4 can be controlled to be at a specified reaction pressure by the reactor pressure control system (not shown) and the compressor 40, e.g., to compress the gas feeds 2, 4 to a reaction pressure of from about 1-20 bar or 1-10 bar. The temperature of the reactor 32 and/or the gas feeds 2, 4 are controlled by the reactor temperature control system and the heater 34 so that the reactant gases are at a specified reaction temperature, e.g., to heat the gas feeds 2, 4 or the reaction mixture within the reactor 32 to a reaction temperature from about 330° C. to about 500° C., e.g. 400° C. $NH_3$ produced in the reactor 32, along with unreacted $N_2$ and Hz, flow from the reactor 32 to the absorber 36, e.g., through the reactor exit/absorber feed line 46, where at least a portion of the $NH_3$ is absorbed by the solid absorbent 50, which, as described above, can be a metal halide-solid support described above. The absorption phase can also include controlling the temperature at the solid absorbent 50 to be at a specified absorption temperature, e.g., with the absorber temperature control system and the heat exchanger 34, for example to an absorption temperature of from about 150° C. to about 400° C., e.g., about 180° C. to about 330° C. The absorption phase can include, in addition to or in place of controlling the temperature at the solid absorbent 50, controlling the pressure in the absorber 36 to be at a specified absorption pressure, for example to an absorption pressure of from about 1 to about 10 bar. The gases exiting the absorber 36, e.g., via the absorber exit line 38, include unreacted $N_2$ and $H_2$ and, in some examples, unabsorbed $NH_3$. In some examples, the absorption phase includes recycling at least a portion of the gasses from the absorber exit line 38 back to the reactor 32, which includes unreacted $N_2$ gas, unreacted $H_2$ gas, and, if present, any unabsorbed $NH_3$, such as via the recycle line 38 and driven by the recirculation pump (not shown).

In an example, the absorption phase is allowed to continue, i.e., with the gasses being allowed to substantially continuously flow and cycle through the reactor 32, the absorber 36, and the recycle line 38, for a specified period of time or until the solid absorbent 50 reaches a specified saturation with respect to absorbed $NH_3$, for example when the absorbent 50 has become substantially saturated with $NH_3$ at its current temperature and pressure. In an example, the absorption phase can be considered to be completed and the system 30 can be considered ready to change over to the desorption phase when the amount of $NH_3$ absorbed by the solid absorbent 50 has reached a predetermined specified percentage of the theoretical $NH_3$ absorption capacity of the solid absorbent 50 (e.g., from about 50%-99% saturated).

The desorption phase can include putting the reaction in the reactor 32 on hold while $NH_3$ is being desorbed from the solid absorbent 50. However, in some embodiments, the system could include one or more reactors and one or more absorbers connected in parallel, in which each absorber being similar or identical to the absorber 36 described herein. In such a system, the reactor can be operated in a continuous or near continuous manner with the output from the reactor being directed to a first of the parallel absorbers until the solid absorbent within reaches a specified saturation of ammonia, at which time the output is switched to the second parallel absorber and the first absorber undergoes desorption conditions. In some examples, there are two or more absorbers 36 that are operated independently from each of the other. In such an example, the process can be operated so that at any one point in time, there is always at least one or more absorbers 36 that is operating in the absorption phase to absorb $NH_3$ that is produced by the reaction in the reactor 32 from the reactant stream.

In one embodiment, a system for producing ammonia comprises (a) a reactor comprising a catalyst that converts at least a portion of nitrogen feed gas and at least a portion of hydrogen feed gas to ammonia ($NH_3$) forming a reaction mixture comprising the ammonia, unreacted nitrogen, and unreacted hydrogen; (b) an absorber configured to selectively absorb ammonia from the reaction mixture at a temperature of about 180-330° C. and a pressure of about 1-50 bar, preferably 1-20 bar, the absorber comprising a solid absorbent, the solid absorbent comprising at least one metal halide and a solid support; and (c) a recycle line to recycle the unabsorbed ammonium, the unreacted nitrogen and hydrogen gas to the reactor.

In some embodiments, the system 30 does not comprise a condenser in order to separate the liquid ammonia from the reaction mixture.

Methods of Making Ammonia

The present disclosure also contemplates methods of producing ammonia using the stable solid absorbents described herein. The systems described herein can be used in the methods contemplated.

In one embodiment, the method comprises (a) reacting a nitrogen feed gas and a hydrogen feed gas in the presence of a catalyst in a reactor to form ammonia ($NH_3$), wherein the reaction produces a reaction mixture comprising ammonia gas, unreacted nitrogen and unreacted hydrogen, (b) selectively absorbing the ammonia from the reaction mixture in an absorber at a temperature of about 150° C. to about 400° C., preferably about 180° C.-330° C. and a pressure of about 1-20 bar, preferably about 1 bar to about 10 bar, wherein the absorber comprises a solid absorbent comprising at least one metal halide and a solid support; and (c) collecting the ammonia absorbed by the absorber into an ammonia product stream.

In certain embodiments, the method further comprises recycling the unabsorbed ammonium, the unreacted nitrogen and hydrogen gas from the absorber following the absorbing step and providing the recycled gas to the reactor. In some embodiments, the method further comprises a step of desorbing the ammonia from the solid absorbent, wherein the desorbing comprises changing the temperature, pressure, or both of the absorber to an effective temperature, pressure, or both at which the ammonia is selectively desorbed from the absorbent into the ammonia product stream. For example, in some embodiments, the temperature of desorption is greater than 300° C., for example from about 300° C. to about 500° C. when the pressure remains constant (for example, from 1-10 bar). The present invention has been described in terms of one or more preferred embodiments, and it should be appreciated that many equivalents, alternatives, variations, and modifications, aside from those expressly stated, are possible and within the scope of the invention.

As used in this specification and the appended claims, the singular forms "a," "an," and "the" include plural references unless the context clearly dictates otherwise. Any reference to "or" herein is intended to encompass "and/or" unless otherwise stated.

The terms "comprising", "comprises" and "comprised of" as used herein are synonymous with "including", "includes" or "containing", "contains", and are inclusive or open-ended and do not exclude additional, non-recited members, elements, or method steps. The phraseology and terminology used herein is for the purpose of description and should not be regarded as limiting. The use of "including," "comprising," "having," "containing," "involving," and variations thereof, is meant to encompass the items listed thereafter and additional items.

As used herein, "about" means within 5% of a stated value (e.g., within a stated concentration range, within 5% of a stated time frame).

The invention will be more fully understood upon consideration of the following non-limiting examples.

EXAMPLES

Example 1

Better Absorbents for Ammonia Production

This Example improves ammonia synthesis, not by finding better catalysts, but by discovering better separations of the ammonia from the reaction mixture. This Example demonstrates an ammonia synthesis which requires less energy and thus does not require fossil fuels and may use wind-generated electricity to make hydrogen from electrolysis of water, and nitrogen by pressure swing absorption of air. However, the new separation can work either in a conventional or a wind based process.

The stable solid absorbents of the present disclosure can be incorporated into conventional condensation reaction to increase the ability to capture ammonia using lower energy consumption, as depicted in FIG. 1 on the left. In one embodiment, the stable solid absorbents are incorporated into an absorption reaction as depicted in FIG. 1 on the right. The conventional system 10, shown on the left in FIG. 1, consists of a catalytic reactor 12 to make ammonia, heat exchanger 14 operably linked to a condenser 16 to remove the ammonia, and a pump 18 to return unreacted hydrogen and nitrogen 20 to the reactor 12. The alternative reactor of the present invention 30 uses absorbent beds, shown on the right in FIG. 1, also has a reactor 32 and a heat exchanger 34, but replaces the condenser with an absorber 36 containing bed of solid absorbent 50. The use of a solid absorbent 50 which captures the ammonia in a solid crystal is superior to a condenser in two ways: it captures the ammonia at higher temperatures, and it is more selective. However, the absorption may have a smaller equilibrium capacity and take much longer to achieve this capacity. Ammonia is known to be selectively captured in metal halides referred to as "ammines." Therefore, this example demonstrates the forms of ammines and preparation procedures for these ammines that produce good ammonia yield using less energy consumption.

Materials and Methods:

Calcium bromide hydrate (98% purity) was purchased from Acros Organics (Geel, Belgium). Magnesium bromide hexahydrate (99% purity) was obtained from Chem-Impex Int'l. Inc, (Wood Dale, Ill.). Strontium bromide hexahydrate (95% purity), anhydrous strontium chloride (95% purity), and zeolite Y (5.1:1 mole ratio $SiO_2:Al_2O_3$) were purchased from Alfa Aesar (Ward Hill, Mass.). Anhydrous calcium chloride (97% purity), anhydrous magnesium chloride (98% purity), aluminum oxide (98% purity), diatomaceous earth (CAS No. 68855-54-9), kaolinite (CAS No. 1318-74-7), hydrophilic bentonite (CAS No. 1302-78-9), silica gel technical grade (pore size 60 A—CAS No. 112926-00-8) were purchased from Sigma Aldrich (St. Louis, Mo.), Ultrahigh purity nitrogen and ammonia gas cylinders were purchased from Matheson (Eagan, Minn.). Two hundred proof ethanol (ACS grade) and 99.8% HPLC grade methanol were purchased from Pharmico-Aaper (Shelbyville, Ky.) and Sigma Aldrich (St. Louis. Mo.), respectively.

Supported salts Making supported salts can involve pretreating both the salts and the supports. Chloride salts were used as received. Bromides were dried in a tube furnace, under vacuum at 25± 2 inHg with a nitrogen sweep flowing at approximately 50 standard cubic centime per minute (SCCM). We used a multiramp drying protocol. The oven was initially heated at a rate of 5° C./min to 210° C., and then at 0.5° C./min to 400° C. For supports, the oven was heated at 15° C./min to 400° C., and then 5° C./min to 450° C. The drying procedure was continued for 2 hours at final temperature.

The absorbents were prepared as follows: 10 g of dried metal halide was mixed with 200 mL of 50:50 ethanol/methanol, the mixture was then heated with an oil bath to boiling and stirred for at least an hour under total reflux. Then 15 g of porous support was added and the suspension was stirred continuously under the same conditions for another three hours. After the solvent was vacuum-evaporated, the impregnated material was dried in a tube furnace.

Then 10.0 g of sorbent was packed into a six inch piece of half inch Swagelok stainless steel tubing to make a bed. Mixtures of ammonia, nitrogen, and hydrogen were flowed through the bed and outlet concentration was measured. This concentration is initially near zero, but then jumps to a high value at a breakthrough time. This time is then useful to estimate the capacity of the bed. Two grades of stainless steel wool (0000 and 0010) were inserted in the ends of the column to confine the packing materials, and a thermocouple was positioned in the center of the packed bed. The column was wrapped with heating tape and insulation, and pressure gauges were placed upstream and downstream. An inline needle valve was used to control the system's pressure. Nitrogen flow at 50 SCCM and ammonia flow at 10 SCCM were pumped through the bed, and the absorber exhaust was directed toward a gas chromatograph equipped with a TCD detector (Agilent Technologies, Santa Clara, Calif.). For desorption tests, the exhaust was connected to a vacuum pump or fume hood.

Figure 4:
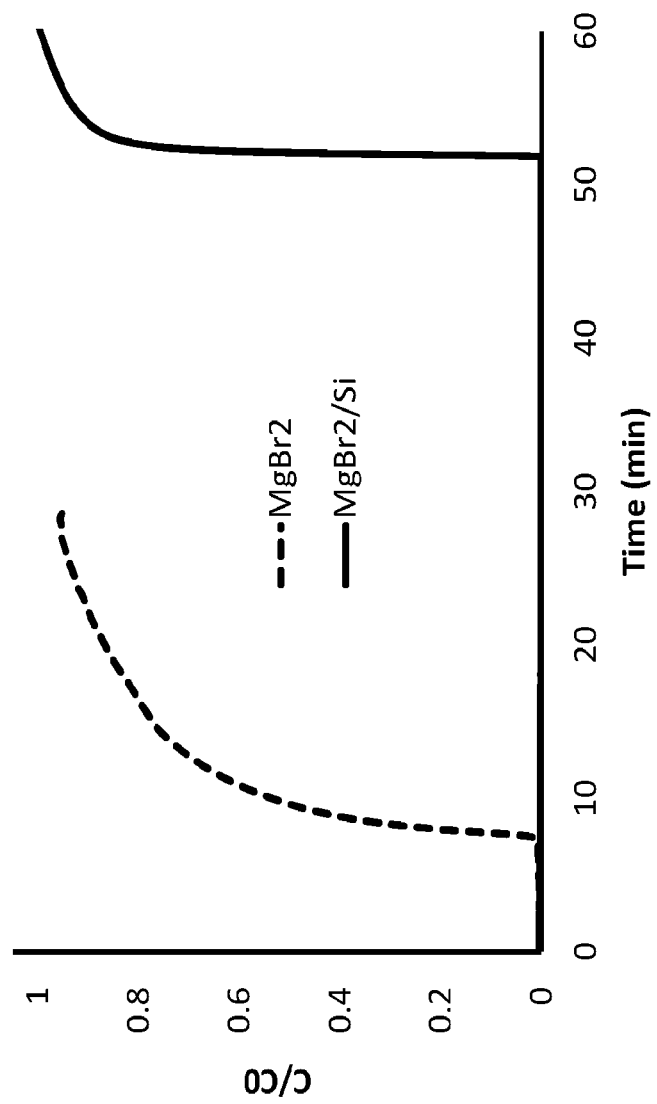
FIG. 4. Typical Breakthrough Curves. The breakthrough is frequently sharp; dispersion seems largely due to bed packing. Capacity depends on support.

As illustrated in FIG. 4 and also in our previous works, supported metal halides display sharp and reproducible breakthroughs, while bulk unsupported metal halides demonstrate dispersed and irreproducible breakthroughs. Since all breakthrough curves were similar, we decided to report the apparent capacity of absorbent with only two parameters, coordination number or apparent sorbent capacity. The coordination number is calculated from the breakthrough time (BT) and the amount of the salt loaded into the support:

$$\text{Coordination Number:} \frac{\frac{(BT \times NH_3 \text{ Flow Rate})}{22,400}}{\left(\frac{\text{fraction salt loading} \times 10 \text{ g}}{MW_{salt}}\right)} \quad (1)$$

The sorbent capacity is calculated based on the cumulative weight of support and salt:

$$\text{Sorbent Capacity:} \frac{\frac{(BT \times NH_3 \text{ Flow Rate})}{22,400} \times 17}{\text{fraction salt loading} \times 10 \text{ g}} \quad (2)$$

Where BT is considered to be the time at which 5% of the inlet concentration occurs. All coordination numbers and sorbent capacities listed in the following tables are calculated from breakthrough times, considering that sorbent was 40 wt % loaded with metal halide salt. These numbers are solely salt characteristics, and the sorption capacity contributed by support is subtracted from reported numbers.

Results

Materials Characterization Past studies of ammines are occasionally compromised by being used not as pure salts, but as partial hydrates. Checking how water and ammonia are released is important. Thermogravimetric analyses (TGA) is a proven tool for studying water release from hydrates. Because the ammonia molecule has characteristics similar to those of the water molecule, TGA is also a helpful tool to relatively understand desorption of ammonia from salts like amminated bromides. As a result, we discuss the dehydration of these materials before we discuss their ammonia absorption.

Figure 2A:
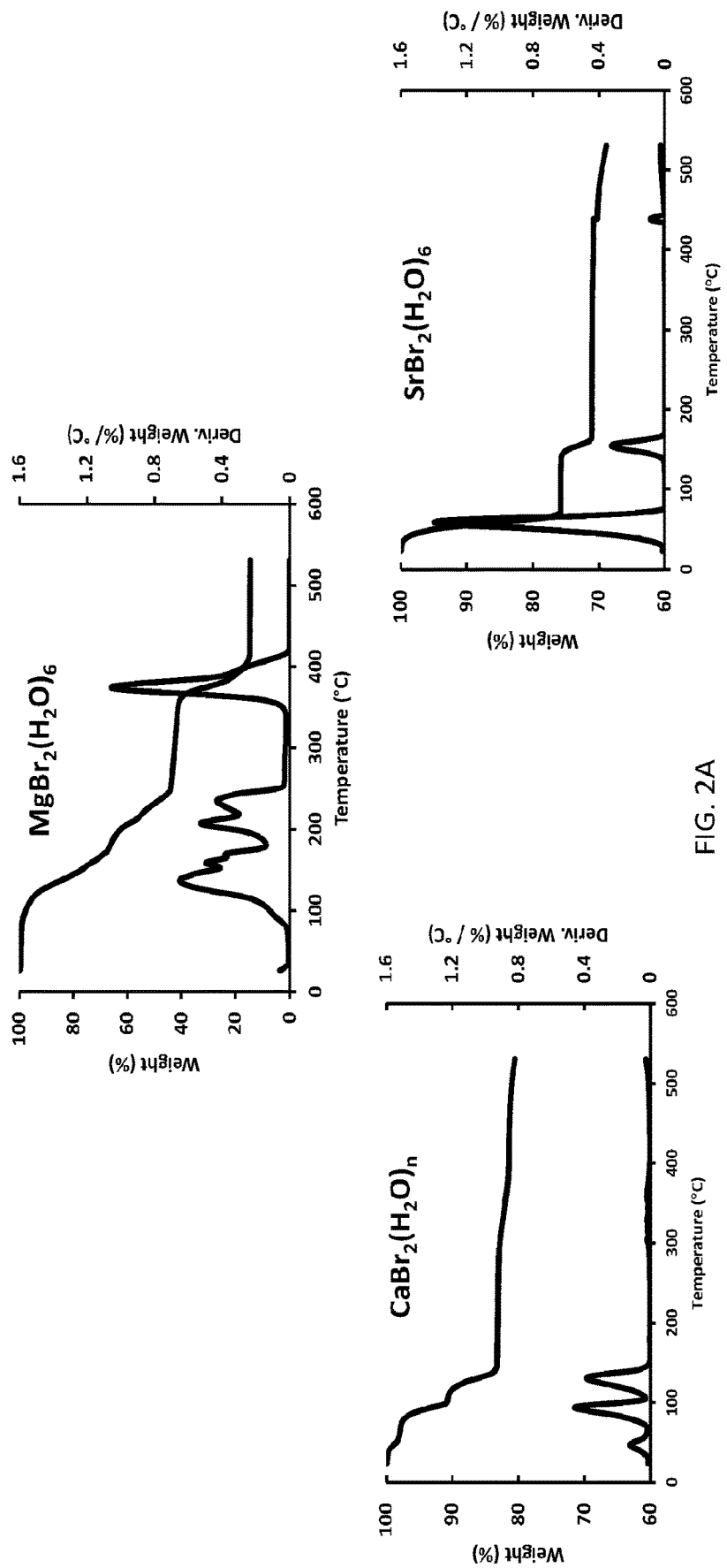
FIG. 2A. TGA Shows Absorbents are Anhydrous. Thermogravimetric analysis of two absorbents. Absorbents must be carefully dehydrated to ensure their absorptions are those of the basic compounds.
Figure 2B:
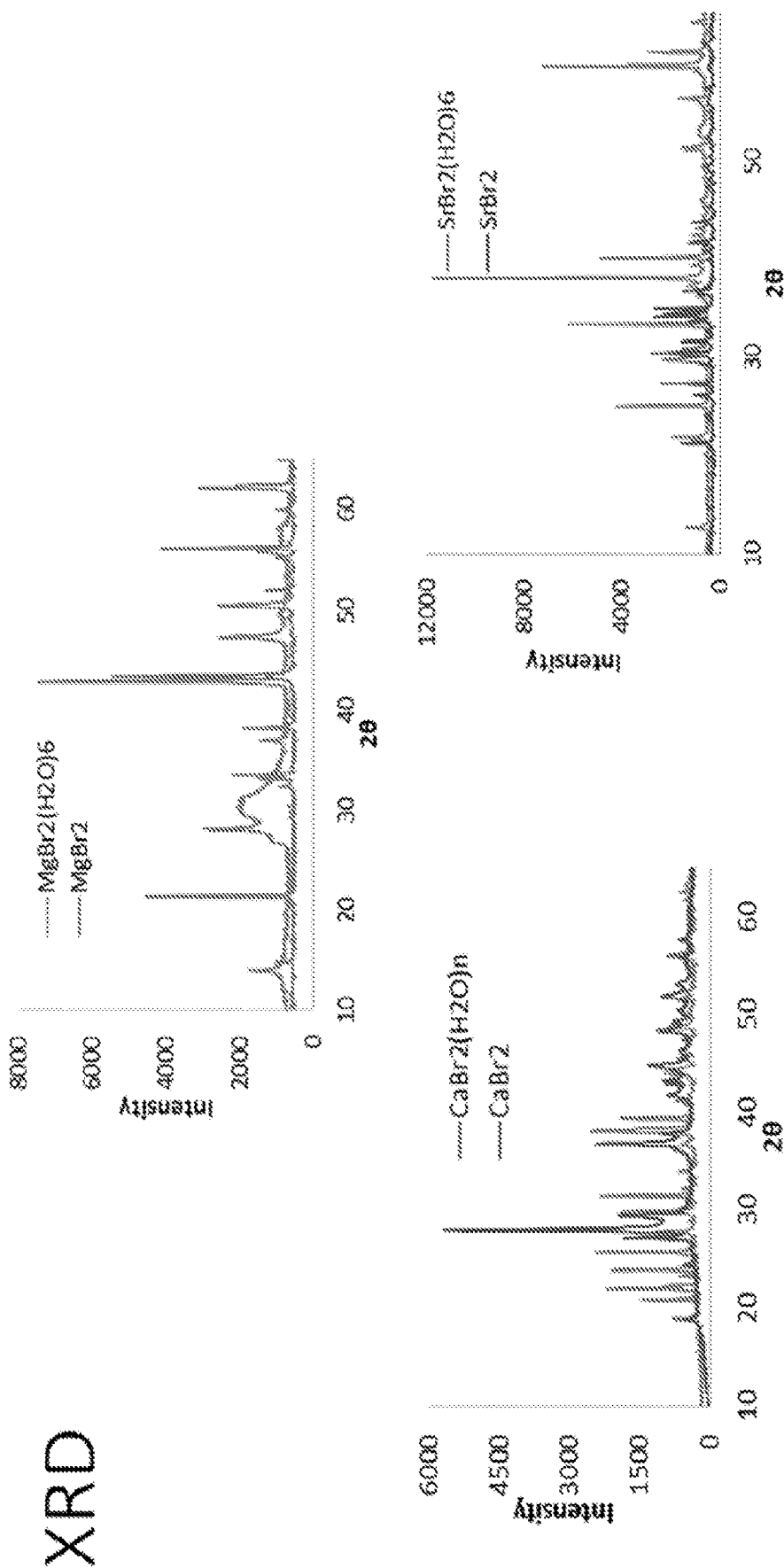
FIG. 2B. Absorbents are Anhydrous. X-ray diffraction shows absorbents are anhydrous. Past results are sometimes complicated by wet absorbents.
Figure 3:
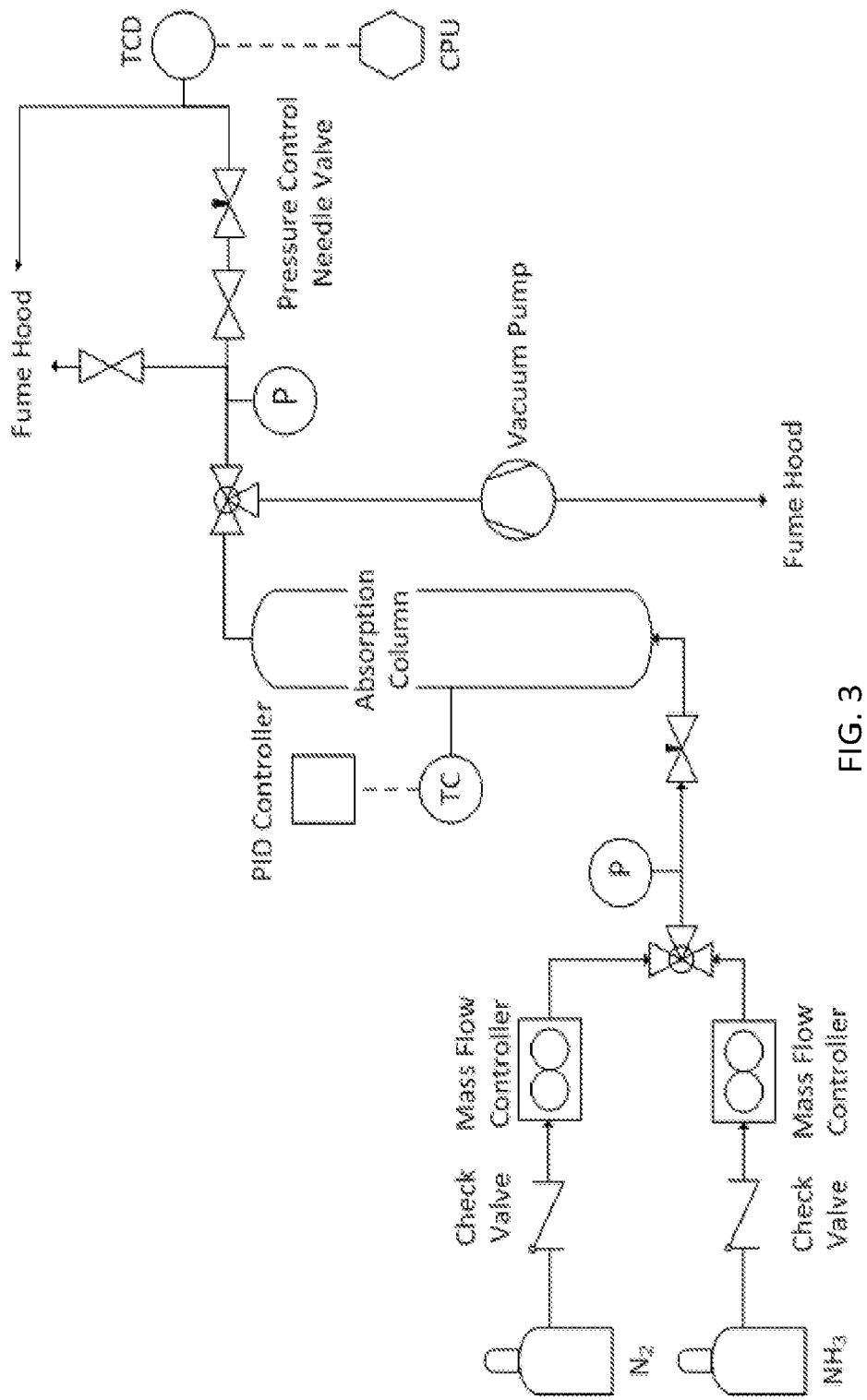
FIG. 3. A Schematic of the Experimental Apparatus. Absorbents are evaluated by the breakthrough times in a packed bed.

Results for the dehydration of such bromides are shown in FIG. 2. High resolution TGA were conducted on a TA Instruments Q500. Samples were heated up from 22° C. to 550° C. at a dynamic rate of 3° C./min, with 100 SCCM nitrogen flow as the purge gas. $MgBr_2$ and $SrBr_2$ were received in hexahydrate form, while $CaBr_2$ was received in hydrated form. Magnesium bromide shows three distinguished peaks at 140° C., 220° C., and 375° C., which indicated the three stages of water release (hexa-, di-, and mono-hydrates). Calcium bromide shows a similar trend, with peaks at 50° C., 95° C., 130° C., contributed by the hexa-, di- and mono-hydrate structures. Lower temperature desorption of water is anticipated for calcium bromide hydrate. According to literature, we should expect four peaks (octa- to hexa-, hexa- to di-, di- to mono-, and mono- to anhydrous) for calcium bromide hydrate. However, we do not observe the octa-hydrate here, probably because 1 bar partial pressure of water is required to have mono-amminated calcium bromide forming at 25° C. Compared to magnesium and strontium bromide, we do see a relatively smaller peak at 50° C., indicating that not all calcium bromide crystals are in hexa-hydrate form. We observe a similar trend for $SrBr_2$. We do not detect the hexa-hydrate structure because hexa hydrate form is unstable at room temperature and humidity.

With 20% reduction in the weight, $CaBr_2$ has the least amount of water in its hydrated form, while $MgBr_2$ loses 70% of its initial weight due to dehydration. X-ray powder diffraction (XRD) (FIG. 2B) results indicated that dried $CaBr_2$ and $SrBr_2$ are obtained after drying, which is consistent with the weight loss observed in the TGA tests (data not shown). However, in case of $MgBr_2$ we observe more than 80% decrease in the sample weight. Dehydration of six molecules of water cannot be responsible for such change. XRD spectrum for $MgBr_2$ shows that the final product of drying magnesium bromide hexa-hydrate is not magnesium bromide, but magnesium oxide. It is believed that magnesium bromide oxidizes to form magnesium oxide, which is consistent with the weight loss observed in TGA results.

Here, we report our efforts to find better absorbents for ammonia at conditions of lower pressure but closer to temperatures used in the existing ammonia synthesis. These efforts explore when absorption may be a superior separation to ammonia condensation now used in conventional, fossil-fuel fired, ammonia synthesis. They may also aid evaluation of smaller scale ammonia manufacture, both to supply fertilizer locally to farms, and to capture stranded wind energy as a liquid carrier for hydrogen, later to be used in fuel cells.

The important results are those for alternative supports for absorption, for varied ratios of support to salt mass, and for alternative absorption chemistries. Other results include the effects of feed flow, different absorbent preparations, and mixtures of absorbents. Details of results follow.

Bulk metal halides: metal halides have extra ordinary capacity for ammonia storage.[1-5] However, achieving the ammonia theoretical capacity is not straightforward.[6,7] Results summarized in Table 1 indicate that metal halide salts in their bulk form are not suitable ammonia absorbent materials for our application. The absorption capacity does not exceed 6 mg $NH_3$/g Salt. In addition, under absorption conditions metal halides are unstable. The dynamic capacity achieved is almost 1-5% of the theoretical capacity. In addition, under absorption conditions metal halides are unstable, as reported earlier. After each loading/unloading cycle, the breakthrough (dynamic capacity) of the subsequent cycle decreases.

TABLE 1

Ammonia Absorption Using Pure Metal Halides
Table 1. Ammonia Absorption Using Pure Metal Halides[a]

| Sorbents | T (° C.) | BT Time (min) | Coordination Number ($mol_{NH3}$/$mol_{salt}$) | Sorbent Capacity ($mg_{NH3}$/$g_{sorbent}$) |
| --- | --- | --- | --- | --- |
| $MgCl_2$ | 150 | 5.1 | 0.032 | 7.72 |
| | 200 | 2.3 | 0.014 | 1.7 |
| | 300 | 1.6 | 0.081 | 1.2 |
| $CaCl_2$ | 150 | 1.4 | 0.0067 | 1.1 |
| | 200 | 0.50 | 0.0025 | 0.38 |
| | 300 | ~0 | ~0 | ~0 |
| $SrCl_2$ | 150 | 0.21 | 0.015 | 0.16 |
| | 200 | 0.10 | 0.00071 | 0.08 |
| | 300 | ~0 | ~0 | ~0 |
| $MgBr_2$ | 150 | 9.2 | 0.082 | 7.4 |
| | 200 | 7.6 | 0.062 | 3.1 |
| | 300 | 4.5 | 0.044 | 4.5 |
| $CaBr_2$ | 150 | 6.5 | 0.058 | 4.9 |
| | 200 | 4.0 | 0.036 | 3.1 |
| | 300 | 2.2 | 0.019 | 1.7 |
| $SrBr_2$ | 150 | 3.1 | 0.027 | 2.4 |
| | 200 | 1.0 | 0.0086 | 0.76 |
| | 300 | 0.44 | 0.0038 | 0.33 |

[a]All experiments used feeds of $N_2$:$NH_3$ = 5:1 and 4 bar, with a total flow of 60 SCCM. The amounts absorbed are much less than those expected at equilibrium.

Figure 5:
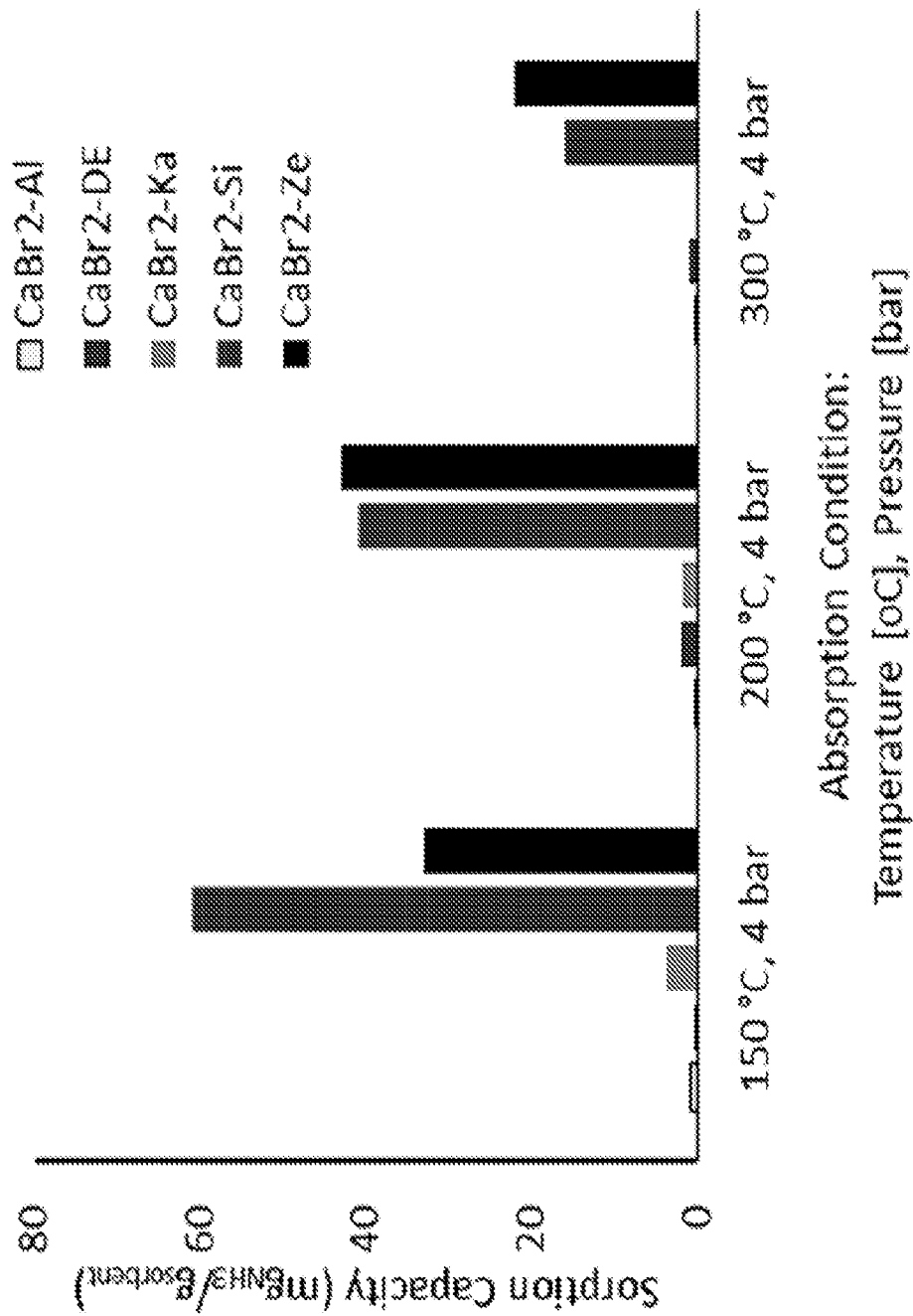
FIG. 5. Capacity on Different Supports. These results for calcium bromide show different capacities depending on the support used for the salt.

Different Supports: We first investigated the effect of different porous supports on the performance of composite sorbents. For these studies, we used $CaBr_2$ as our model metal halide. FIG. 5 summarizes breakthrough studies performed at 4 bar (0.66 bar partial pressure of ammonia) on different supports; these same results are detailed in Table 2. The data are at three different temperatures. The third column shows the breakthrough times; the fourth reports the coordination number inferred from these times; and the last column shows the sorbent capacity. This capacity is the total amount absorbed minus that absorbed by the pure support, which is always less than 10% of the total.

There are two main conclusions to be drawn from this table. First, the results support that supporting metal halides on porous supports improves their apparent capacity and the structural stability. More specifically, the amounts absorbed are much greater than those we have measured for the neat halides as summarized in Table 1. Second, alumina (Al), kaolinite (Ka), and diatomaceous earth (DE) are not effective for supporting metal halides: the apparent capacity for ammonia never exceeds 9 mg $NH_3$/g salt for these materials. Both silica (Si) and zeolite (Ze) make good supports for metal halides for the absorption of ammonia with high sorbent capacity and higher coordination numbers.

The equilibrium capacity of $CaBr_2$ must be the same in all these experiments, independent of the support used. The apparent capacity changes because for the particular preparation and exposure time used. Not to be bound by any theory, but the differences will not be due to changes in the diffusion coefficient, because diffusion in all cases is of ammonia into calcium bromide and are not the result of an altered partition coefficient between the gas and the salt. It is believed that the most likely explanation is that the surface area per mass of salt is altered by having the salt spread out onto the support. This is indirectly supported by the observation that the pure salt goes from a free-flowing powder to a concrete mass after exposure to ammonia. The salt is softened by the ammonia, and seems to melt together.

Supports like silica seem to reduce this fusion dramatically. In previous work, we suggested that alumina could disperse the salt in nanocrystals dispersed in small cracks in alumina. Micrographs demonstrate that a similar phenomenon may be involved here (data not shown).

The $CaBr_2$ on Si and Ze supports achieves a high coordination number even for temperatures as high as 300° C., close to the theoretical capacity of $CaBr_2$ at these temperatures. At 150° C., the sorption capacity for $CaBr_2$—Ze is less than $CaBr_2$—Si, while at 200° C. and 300° C. it is higher. Still, because silica is cheap and showed a more consistent absorption capacity at the temperatures studied, we decided to use it as our base case for studying different salts.

Figure 6:
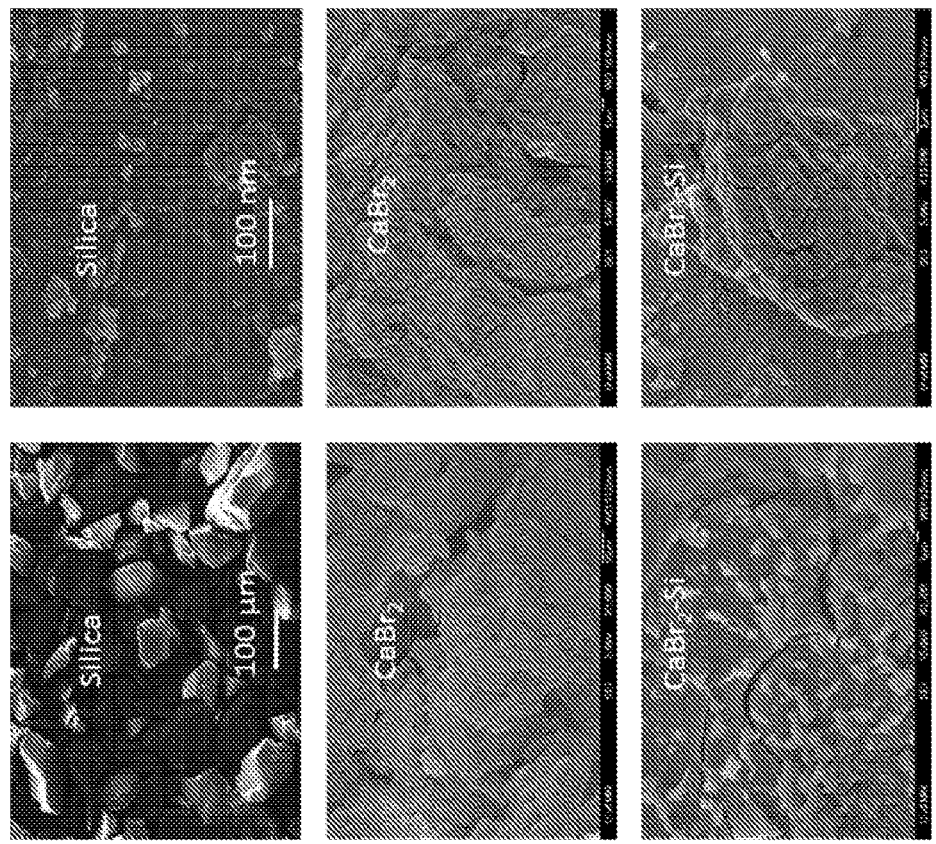
FIG. 6. Micrographs of calcium chloride on silica. A large area for ammonia absorption is apparently sustained by interactions with the silica support.

The capacity of the bed depends on the support, as shown in FIG. 5, and as detailed in Table 2. Normally, large capacity is preferred over small capacity. Capacities were higher on supports like silica and zeolite Y. Capacity also depended on the ratio of salt to support, as shown in FIG. 6 and detailed in Table 3: capacities were low for no salt and pure salt than for mixed salt and support. The maximum capacity tended to be close to a mixture which was half salt and half support. Finally, capacity varies with salt chemistry, as shown schematically in FIG. 7 and detailed in FIG. 4. These data allow choices and designs of absorbents suitable for the new ammonia process.

TABLE 2

Ammonia Absorption for Calcium Bromide Supported on
Different Substrates. Silica and zeolite work best. The capacity shown is that
observed minus that for the support alone. The pressure in these experiments was 4 bar.
Table 2. Ammonia Absorption for Calcium Bromide Supported on Different substrates[a]

| Sorbents | T (° C.) | BT Time (min) | Coordination Number ($mol_{NH3}/mol_{salt}$) | Sorbent Capacity ($mg_{NH3}/g_{sorbent}$) | BET Surface Area ($cm^2/g$) (Support's Actual BET area) |
|---|---|---|---|---|---|
| $CaBr_2$—Al | 150 | 3.4 | 0.022 | 2.6 | 1 (184) |
|  | 200 | 0.78 | 0.0042 | 0.60 |  |
|  | 300 | 0.20 | 0.0046 | 0.16 |  |
| $CaBr_2$—DE | 150 | 2.3 | 0.011 | 1.7 | 2 (85) |
|  | 200 | 4.0 | 0.062 | 3.0 |  |
|  | 300 | 1.9 | 0.030 | 1.5 |  |
| $CaBr_2$—Ka | 150 | 6.9 | 0.11 | 5.2 | <1 (16) |
|  | 200 | 3.4 | 0.049 | 2.6 |  |
|  | 300 | 1.0 | 0.0094 | 0.78 |  |
| $CaBr_2$—Si | 150 | 80 | 1.7 | 61 | 399 (540) |
|  | 200 | 54 | 1.1 | 41 |  |
|  | 300 | 21 | 0.45 | 16 |  |
| $CaBr_2$—Ze | 150 | 48 | 0.95 | 33 | 541 (985) |
|  |  | 50 | 0.99 | 34 |  |
|  | 200 | 59 | 1.3 | 43 |  |
|  |  | 57 | 1.2 | 42 |  |
|  | 300 | 30 | 0.65 | 22 |  |

[a]Silica and zeolite Y work best. The capacity shown is that observed minus that for the support alone. All experiments used feeds of $N_2:NH_3$ = 5:1 and 4 bar. Supported sorbents were prepared with 40% salt with the following supports: alumina (Al), kaolinite (Ka), diatomaceous earth (DE), silica (Si), zeolite Y (Ze).

Different Salt Loading: We now turn from the substrate used to the amount of salt loaded on the substrate. As before, our goal is the identification of conditions which supply high apparent capacity. Results for different impregnation ratios of $CaBr_2$: Si are summarized in FIG. 7 and Table 3. For comparison, both pure silica support (0% loading) and pure $CaBr_2$ salt (100% loading) are included. No salt was added to the impregnation solution for pure silica; and no silica was added for pure salt. All tests were carried out at 4 bar.

displays a small capacity under the conditions used, equal to only 1-2% of its equilibrium capacity at each temperature studied. We believe that this is due to the small surface area and the low diffusion coefficient of the bulk salt.

In contrast, $CaBr_2$ supported on Si shows sorption capacities as high as 140 mg $NH_3$/g salt. Not surprisingly, these are greater at lower temperatures, and drop at higher temperatures. As the figure and table show, the amounts increase to a maximum at greater than 50% salt. The coordination

TABLE 3

Apparent Capacities of Absorbents Prepared with Different
Amounts of Salt. These apparent capacities can be much less than those expected from
thermodynamic equilibria. All experiments used feeds of $N_2/NH_3$ = 5 and 4 bar pressure.
Table 3. Apparent Capacities of Absorbents Prepared with Different Amounts of Salt[a]

| Sorbents | Si:$CaBr_2$ ($CaBr_2$%) | T (° C.) | BT Time (min) | Coordination Number ($mol_{NH3}/mol_{salt}$) | Sorbent Capacity ($mg_{NH3}/g_{sorbent}$) |
|---|---|---|---|---|---|
| Si | 1:0 | 150 | 12 | — | 10 |
|  | (0) | 200 | 6.6 | — | 5.6 |
|  |  | 300 | 2.3 | — | 2.0 |
| $CaBr_2$—Si | 15:1 | 150 | 23 | 2.0 | 20 |
|  | (6.25) | 200 | 14 | 1.4 | 12 |
|  |  | 300 | 5.9 | 0.62 | 5.0 |
| $CaBr_2$—Si | 3:1 | 150 | 53 | 1.6 | 14 |
|  | (25) | 200 | 33 | 0.99 | 25 |
|  |  | 300 | 16 | 0.50 | 12 |
| $CaBr_2$—Si | 3:2 | 150 | 80 | 1.7 | 61 |
|  | (40) | 200 | 54 | 1.1 | 41 |
|  |  | 300 | 21 | 0.45 | 16 |
| $CaBr_2$—Si | 3:4 | 150 | 111 | 1.7 | 85 |
|  | (57) | 200 | 88 | 1.3 | 67 |
|  |  | 300 | 24 | 0.36 | 18 |
| $CaBr_2$ | 0:1 | 150 | 6.5 | 0.06 | 4.9 |
|  | (100) | 200 | 4.0 | 0.04 | 3.1 |
|  |  | 300 | 2.2 | 0.02 | 1.7 |

[a]These apparent capacities can be much less than those expected from thermodynamic equilibria. All experiments used feeds of $N_2:NH_3$ = 5:1 and 4 bar. Supported sorbents were prepared with silica (Si) as the support.

The results show that silica alone has a very small adsorption capacity (i.e., 0.01 g $NH_3$/g sorbent at 150° C.) and is not capable of absorption at 300° C. Pure bulk $CaBr_2$ number, that is, the moles of ammonia per mole of salt, is as high as two, which is close to the limit expected at 150° C. temperatures and thermodynamic equilibria. The limit at lower temperatures can be as high as eight, which is not approached in these experiments. However, the uptake is considerably larger than in the pure salt. Thus, better absorbents should use masses of support and salt which are about equal, even though the resulting absorption may be apparent, short of the thermodynamic maximum possible.

Different Salts: We evaluated how absorbent capacity can be varied by changing salt chemistry. For these studies, we choose 40% salt, 60% support as our target loading. In our earlier studies, we focused mainly on calcium bromide. This example uses additional absorbent capable of separating ammonia at higher temperatures—closer to the ammonia synthesis temperature. In this work, we focus alkali metal chlorides and bromides. As demonstrated in FIG. 8 and Table 4, we have identified solid absorbents that have increased capacity at elevated temperatures (150, 200, and 300° C.) and different pressures (2, 3, and 4 bar).

These results suggest the following generalizations. Magnesium salts absorbs slightly more ammonia than the calcium salts and both absorb much more than strontium salts. Bromides absorb more than chlorides on a mole to mole basis, but are more nearly the same on a mass to mass basis. This suggests that the lower cost and greater stability of the chlorides may give them an advantage in practice. Bromides show an Arrhenius temperature dependence, but relatively little variation with pressure. Chlorides show much less temperature dependence, but more variation with pressure. Finally, the pressure dependence of the apparent amount absorbed is less than first order but more than zero order, a point discussed in more detail below.

These generalizations have chemical implications. Both coordination numbers and sorption capacities show that alkaline metal with smaller mass number have higher capacity for ammonia, while bromides have higher capacity for ammonia than chlorides. This pattern reflects the fact that smaller alkaline metals and larger halides have greater affinity for ammonia. Additionally, ammine bonds in metal halides with smaller metals and larger halides are stronger, and the crystal structure of the ammoniated salt is more closely packed, hence retaining ammonia more tightly. This is supported by results of Aoki[11], who related higher capacities to electronegativity of metals and halides: anions with smaller negativity and metals with higher negativity have higher attraction (lower plateau pressure) for ammonia.

TABLE 4

Apparent Capacity of Different Salts vs Temperature and Pressure. The value can guide the choice of different absorbents.
Table 4. Apparent Capacity of Different Salts[a]

| Sorbents | T (° C.) | P (bar) | BT Time (min) | Coordination Number ($mol_{NH3}/mol_{salt}$) | Sorbent Capacity ($mg_{NH3}/g_{sorbent}$) |
|---|---|---|---|---|---|
| (a) Chloride Salts | | | | | |
| MgCl$_2$—Si | 150 | 2 | 69 | 0.65 | 52 |
| | | 3 | 78 | 0.75 | 59 |
| | | 4 | 91 | 0.89 | 69 |
| | 200 | 2 | 63 | 0.63 | 48 |
| | | 3 | 73 | 0.73 | 55 |
| | | 4 | 78 | 0.78 | 59 |
| | 300 | 2 | 35 | 0.35 | 26 |
| | | 3 | 40 | 0.41 | 30 |
| | | 4 | 44 | 0.45 | 33 |
| CaCl$_2$—Si | 150 | 2 | 27 | 0.25 | 21 |
| | | 3 | 35 | 0.35 | 27 |
| | | 4 | 44 | 0.46 | 33 |
| | 200 | 2 | 16 | 0.15 | 12 |
| | | 3 | 20 | 0.19 | 15 |
| | | 4 | 25 | 0.26 | 19 |
| | 300 | 2 | 6.4 | 0.062 | 4.8 |
| | | 3 | 7.4 | 0.074 | 5.6 |
| | | 4 | 9.1 | 0.095 | 6.9 |
| SrCl$_2$—Si | 150 | 2 | 6.7 | ~0[b] | 5.1 |
| | | 3 | 8.0 | 0.013 | 6.1 |
| | | 4 | 9.9 | 0.047 | 7.5 |
| | 200 | 2 | 3.5 | ~0[b] | 2.7 |
| | | 3 | 4.6 | 0.012 | 3.5 |
| | | 4 | 6.0 | 0.036 | 4.6 |
| | 300 | 2 | 2.2 | 0.014 | 1.7 |
| | | 3 | 2.1 | 0.012 | 1.6 |
| | | 4 | 2.6 | 0.022 | 2.0 |
| (b) Bromide Salts | | | | | |
| MgBr$_2$—Si | 150 | 2 | 79 | 1.5 | 60 |
| | | 3 | 73 | 1.4 | 56 |
| | | 4 | 81 | 1.5 | 62 |
| | 200 | 2 | 47 | 0.87 | 35 |
| | | 3 | 49 | 0.92 | 37 |
| | | 4 | 52 | 0.98 | 39 |
| | 300 | 2 | 29 | 0.57 | 22 |
| | | 3 | 27 | 0.52 | 20 |
| | | 4 | 28 | 0.55 | 21 |
| CaBr$_2$—Si | 150 | 2 | 62 | 1.2 | 45 |
| | | 3 | 74 | 1.5 | 56 |
| | | 4 | 80 | 1.7 | 61 |
| | 200 | 2 | 41 | 0.82 | 31 |
| | | 3 | 46 | 0.94 | 35 |
| | | 4 | 54 | 1.1 | 41 |
| | 300 | 2 | 16 | 0.33 | 12 |
| | | 3 | 25 | 0.52 | 19 |
| | | 4 | 21 | 0.45 | 16 |
| SrBr$_2$—Si | 150 | 2 | 22 | 0.40 | 16 |
| | | 3 | 23 | 0.44 | 18 |
| | | 4 | 26 | 0.53 | 20 |
| | 200 | 2 | 8.3 | 0.12 | 6.3 |
| | | 3 | 10 | 0.17 | 7.7 |
| | | 4 | 13 | 0.25 | 9.9 |
| | | 4 | 13 | 0.24 | 9.7 |
| | 300 | 2 | 3.8 | 0.068 | 2.9 |
| | | 2 | 3.0 | 0.045 | 2.3 |
| | | 3 | 6.0 | 0.13 | 4.5 |
| | | 4 | 9.3 | 0.22 | 7.1 |

[a]All experiments used feeds of N$_2$:NH$_3$ = 5:1. Sorbents were prepared with 40% silica (Si).
[b]The column breakthrough was shorter than the sorption capacity of bare silica (BT < BTs), so the salt coordination number could not be estimated.

Other Experiments: Experiments were performed with mixed salts, with mixed impregnation solvents, and with varying feed flow. As shown in Table 5, the results with mixed salts fell between those for pure salts and show no advantages from being present as mixtures. Results for mixed cations are typical: CaMgBr lies between CaBr and MgBr at 300° C.; and the breakthrough times of MgSrBr and CaSrBr are almost exactly the averages of the pure salts, respectively. Results for mixed anions show that CaBrCl is much better than CaCl$_2$ but slightly worse than CaBr$_2$. The average breakthrough time was 85% of the way from CaCl$_2$ to CaBr$_2$. However, SrBrCl was much closer to SrCl$_2$: the average breakthrough time was 6% of the way from SrCl$_2$ to SrBr$_2$. These results with mixed salts would seem to imply that we have mixtures of pure salt crystals, and not crystals containing an actual mixture, for example, mixed halides. Using a mixed impregnation solvent and different pressures at the same superficial velocity also had little effect on capacity, as shown in Tables 6-7. The implications of all these experiments are addressed in the following discussion section.

TABLE 5

Mixed Salts.
Table 5. Mixed Salts[a]

(a) Mixed Cations

| Sorbents | T (° C.) | BT Time (min) | Coordination Number ($mol_{NH3}$/$mol_{salt}$) | Sorbent Capacity ($mg_{NH3}$/$g_{sorbent}$) |
|---|---|---|---|---|
| MgCaBr—Si | 150 | 83 | 1.6 | 63 |
|  | 200 | 55 | 1.1 | 42 |
|  | 300 | 27 | 0.55 | 20 |
| MgSrBr—Si | 150 | 55 | 1.1 | 42 |
|  | 200 | 35 | 0.74 | 27 |
|  | 300 | 15 | 0.33 | 12 |
| SrCl$_2$—Si | 150 | 58 | 1.3 | 44 |
|  | 200 | 37 | 0.82 | 28 |
|  | 300 | 14 | 0.31 | 11 |

(b) Mixed Anions

| Sorbents | T (° C.) | P (bar) | BT Time (min) | Coordination Number ($mol_{NH3}$/$mol_{salt}$) | Sorbent Capacity ($mg_{NH3}$/$g_{sorbent}$) |
|---|---|---|---|---|---|
| MgClBr—Si | 150 | 2 | 59 | 0.73 | 45 |
|  |  | 3 | 64 | 0.80 | 49 |
|  |  | 4 | 65 | 0.82 | 50 |
|  | 200 | 2 | 37 | 0.47 | 28 |
|  |  | 3 | 42 | 0.53 | 32 |
|  |  | 4 | 46 | 0.59 | 35 |
|  | 300 | 2 | 23 | 0.31 | 18 |
|  |  | 3 | 26 | 0.35 | 20 |
|  |  | 4 | 30 | 0.40 | 22 |
| CaClBr—Si | 150 | 2 | 60 | 0.81 | 40 |
|  |  | 3 | 58 | 0.78 | 39 |
|  |  | 4 | 67 | 0.91 | 44 |
|  | 200 | 2 | 77 | 1.1 | 51 |
|  |  | 3 | 39 | 0.53 | 26 |
|  |  | 4 | 41 | 0.57 | 28 |
|  | 300 | 2 | 48 | 0.67 | 32 |
|  |  | 3 | 14 | 0.19 | 9.1 |
|  |  | 4 | 16 | 0.23 | 11 |
|  |  |  | 20 | 0.29 | 13 |
| SrClBr—Si | 150 | 2 |  |  |  |
|  |  | 3 | 7.2 | <0.001 | 5.5 |
|  |  | 4 | 9.7 | 0.055 | 7.4 |
|  | 200 | 2 | 11 | 0.081 | 8.4 |
|  |  | 3 | 3.6 | ~0[b] | 2.7 |
|  |  | 4 | 4.6 | 0.012 | 3.5 |
|  |  | 2 | 6.1 | 0.047 | 4.7 |
|  | 300 | 3 | 2.2 | 0.019 | 1.7 |
|  |  | 4 | 2.3 | 0.020 | 1.7 |
|  |  | 2 | 2.6 | 0.027 | 2.0 |

[a]The results fall between those for pure salts and show no advantages from being present as mixtures. All experiments used feeds of $N_2$:$NH_3$ = 5:1. Sorbents were prepared with 40% silica (Si).
[b]The column breakthrough was shorter than the sorption capacity of bare silica (BT < BTs), so the salt coordination number could not be estimated.

TABLE 6

Different Solvents (Using different solvents to make the supported material had little effect; the pressure was 4 bar)
Table 6. Different Solvents[a]

| Sorbents | Solvents | T (° C.) | BT Time (min) | Coordination Number ($mol_{NH3}$/$mol_{salt}$) | Sorbent Capacity ($mg_{NH3}$/$g_{sorbent}$) |
|---|---|---|---|---|---|
| CaBr$_2$—Si | MeOH/EtOH | 150 | 80 | 1.8 | 61 |
|  |  | 200 | 54 | 1.2 | 41 |
|  |  | 300 | 21 | 0.48 | 16 |
| CaBr$_2$—Si | MeOH | 150 | 98 | 2.2 | 75 |
|  |  | 200 | 70 | 1.6 | 53 |
|  |  | 300 | 27 | 0.61 | 21 |
| CaBr$_2$—Si | EtOH | 150 | 100 | 2.2 | 76 |
|  |  | 200 | 66 | 1.5 | 50 |
|  |  | 300 | 25 | 0.56 | 19 |
| CaBr$_2$—Si | H$_2$O | 150 | 82 | 1.8 | 63 |
|  |  | 200 | 54 | 1.2 | 41 |
|  |  | 300 | 22 | 0.49 | 17 |

[a]Using different solvents to make the supported material had little effect. All experiments used feeds of $N_2$:$NH_3$ = 5:1 and 4 bar pressure. Sorbents were prepared with 40% salt on silica (Si).

TABLE 7

Capacity vs. Pressure (using different pressures at the same superficial velocity had no effect on capacity)
Table 7. Capacity vs Pressure[a]

| Pressure (bar) | N$_2$ Flow Rate (SCCM) | NH$_3$ Flow rate (SCCM) | BT Time (min) | Coordination Number ($mol_{NH3}$/$mol_{salt}$) | Sorbent Capacity ($mg_{NH3}$/$g_{sorbent}$) |
|---|---|---|---|---|---|
| 2 | 50 | 10 | 63 | 1.2 | 47 |
| 3 | 75 | 15 | 43 | 1.2 | 48 |
| 4 | 100 | 20 | 33 | 1.3 | 50 |

[a]Using different pressures at the same superficial velocity had no effect on capacity. All experiments used feeds of $N_2$:$NH_3$ = 5:1 and 150° C. Sorbents were prepared with 40% CaBr$_2$ on silica (Si).

Discussion

The Example shows how to synthesize ammonia more efficiently using the standard Haber-Bosch catalyst but changing the ammonia separation. More specifically, we replace the current ammonia condenser (16) with a high temperature absorber (36). As we have already shown, this allows more ammonia to be made at a lower pressure than that currently achieved in our conventional wind-powered pilot plant, as we are able to produced ammonium using pressures less than 10 bar (e.g., 3-5 bar). Because such a process would have a lower capital cost, it may be suitable for smaller scale production than that currently used. This new process could let farmers make their own ammonia fertilizer locally. It could provide a route to capturing stranded wind energy, with ammonia serving as a liquid hydrogen carrier which can be shipped to distant urban areas.

The absorbent used should be cheap, reusable, and have a high capacity for ammonia per mass of solid. Most of the past search for better absorbents has sensibly focused on ammines, especially alkali earth halides, because these absorb large amounts of ammonia. For example, at equilibrium at room temperature, calcium bromide can form a complex with eight moles of ammonia, and magnesium can complex with six. These thermodynamically stable complexes may not form rapidly, for their production is probably limited by diffusion into the solid. If the ammines are supported on an inorganic inert, their uptake may be faster. Often, the ammine-ammonia complexes release most of their ammonia with rising temperature, especially above 300° C. Here we seek an ammine which can not only complex a lot of ammonia, but at high temperature and with quick release.

Figure 7:
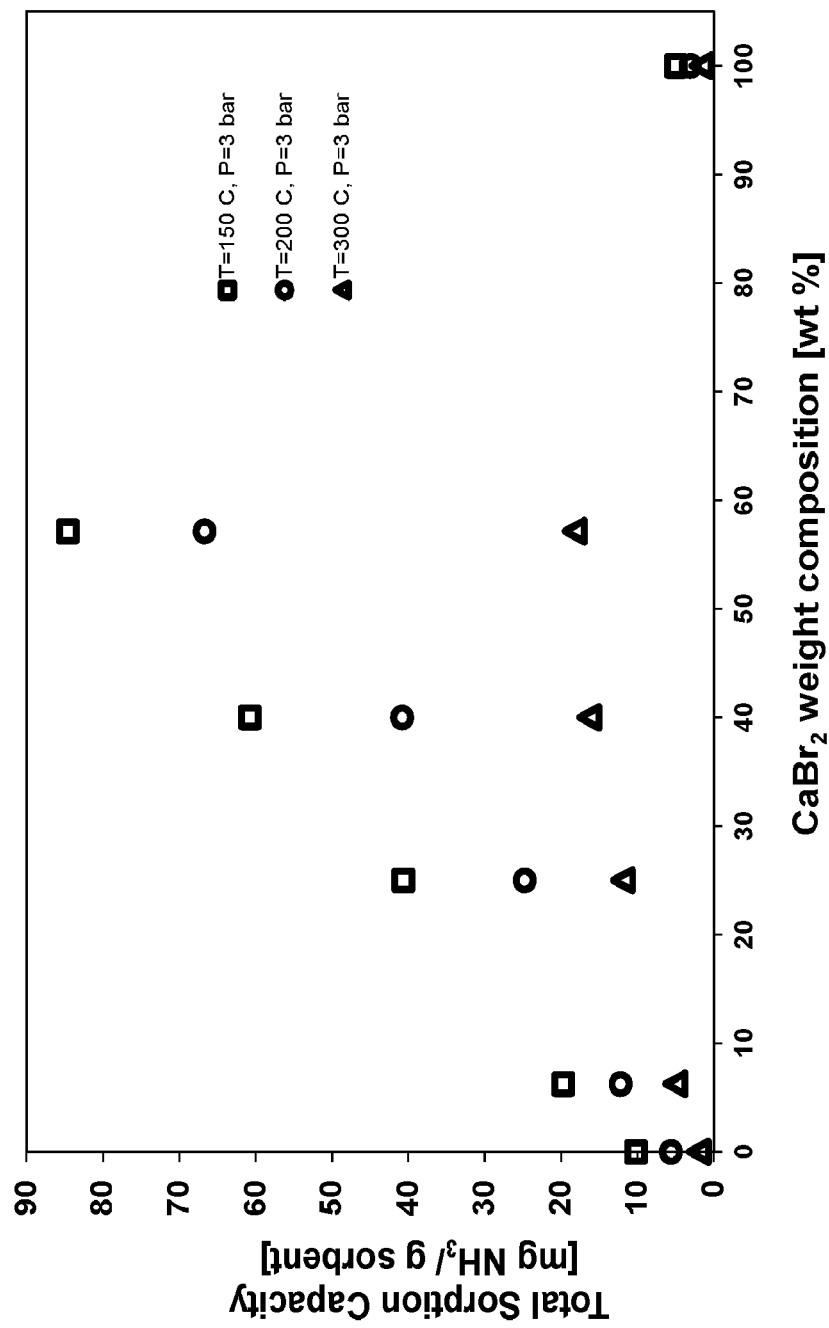
FIG. 7. Apparent Absorption with Different Amounts of Support. The amount absorbed is small without salt, and small with pure salt. The maximum absorbed is greatest at around a 50-50 mixture.

This Example demonstrates an absorbent with a better support, with a high apparent capacity. Silica and zeolite have much longer breakthrough times than alumina, kaolinite, and diatomaceous earth as demonstrated in FIG. 5. Hence, silica and zeolite Y have higher apparent capacity, and are the better choices among the supports studied. Preparations with different amounts of ammine and support are shown in FIG. 7 and demonstrate when the amount of salt is about or above 40%, the apparent capacity is reaching a maximum. Smaller amounts of salt have a lower capacity because they have fewer sites to store the salt; and larger amounts fuse, and so obscure available sights and do not offer as much surface area for diffusion into the salt. The optimum is a balance between thermodynamics—giving a large possible capacity—and kinetics giving a large absorption rate because of a large area.

Figure 8:
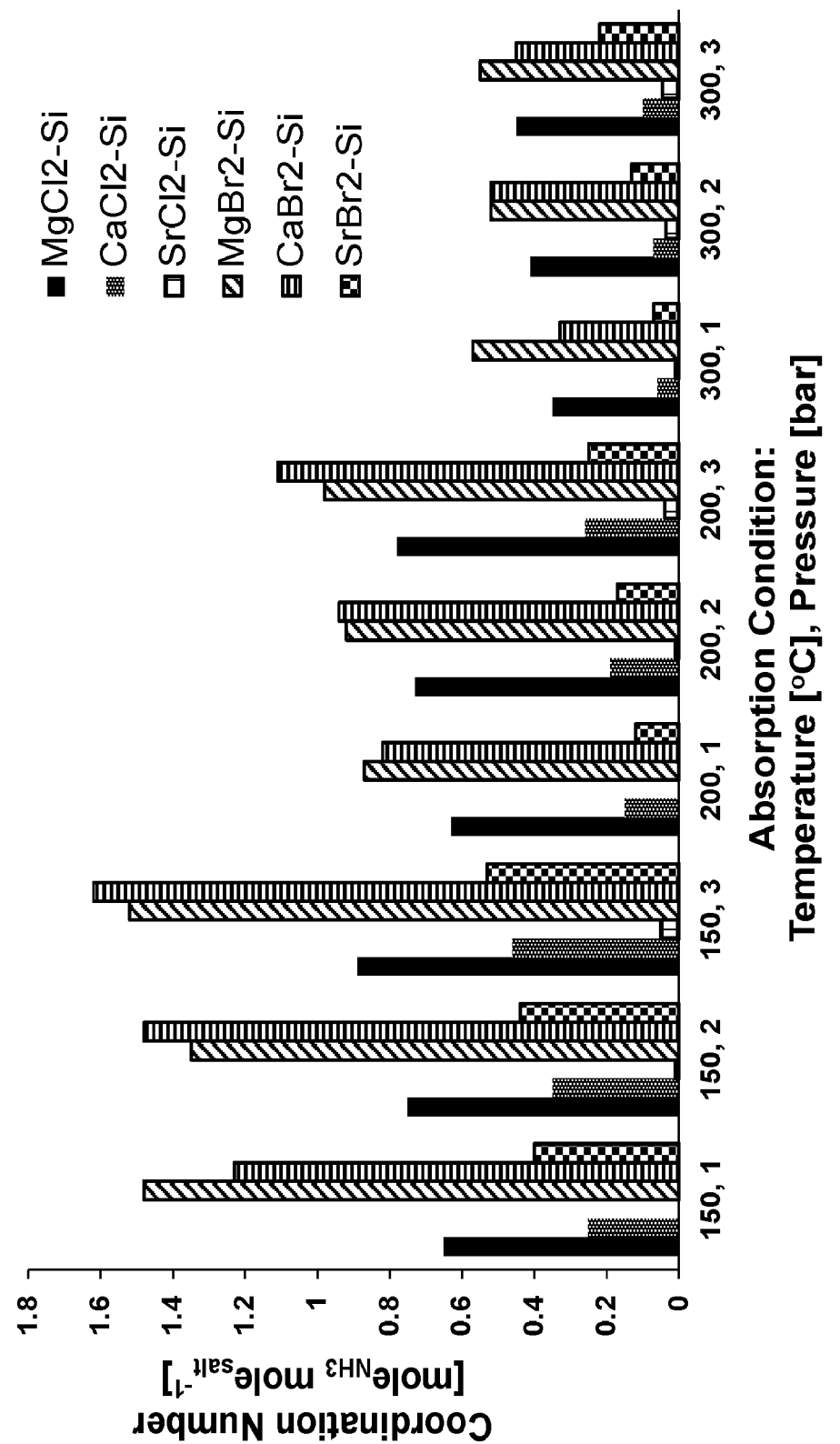
FIG. 8. Apparent Absorption by Different Salts. The amount per mole of salt is an alternative measure of merit (the most practical measure being the amount per unit mass of sorbent).

Different chemistries also give different apparent capacities, as shown in FIG. 8. Here, it is important to consider what a better absorbent should do. In a thermodynamic sense, we might prefer apparent capacity as moles of ammonia per mole of ammine; but in a practical sense, we will seek moles of ammonia per mass of salt. This basis on mass will make the absorber smaller. In seeking an optimum process, we want to regenerate the absorbent by changing the pressure, because that is less energy demanding; but to insure the best possible separation, we can get a bigger change in amount absorbed with a change in temperature than one in pressure.

Specific systems with better results are evident from the data in Table 4. In particular, chlorides may be better than bromides, because the cheaper chlorides give about the same number of moles of ammonia absorbed per mass of solid. However, capacity in bromides changes more with temperature, and so may be a better choice for an actual process.

This example assumes that quick desorption of the ammonia is possible, regardless of the absorbent is used. Clues to the desorption mechanism are given in Table 3, which show that the uptake is sometimes independent of the pressure, and at other times seems to vary with the square root of the pressure. The independence of pressure would occur if the absorption approached equilibrium, where the pressure dropped to the value of a particular ammine stoichiometry. The square root dependence on the pressure is consistent with a shrinking core model, occurring when the absorbent is not in equilibrium but controlled by layer of ammonia-saturated material over a core of unreacted ammine.

The absorbent compositions herein can be used to design of a small-scale, low-pressure alternative to Haber-Bosch as shown in FIG. 1.

REFERENCES (1) Sorensen, R. Z.; Hummelshøj, J. S.; Klerke, A.; Reves, J. B.; Vegge, T.; Nørskov, J. K.; Christensen, C. H. Indirect, reversible high-density hydrogen storage in compact metal ammine salts. J. Am. Chem. Soc. 2008, 130 (27), 8660-8668.
(2) Klerke, A.; Christensen, C. H.; Nørskov, J. K.; Vegge, T. Ammonia for hydrogen storage: challenges and opportunities. J. Mater. Chem. 2008, 18 (20), 2304-2310.
(3) Christensen, C. H.; Sørensen, R. Z.; Johannessen, T.; Quaade, U. J.; Honkala, K.; Elmøe, T. D.; Køhler, R.; Nørskov, J. K. Metal ammine complexes for hydrogen storage. J. Mater. Chem. 2005, 15 (38), 4106-4108.
(4) Elmøe, T. D.; Sørensen, R. Z.; Quaade, U.; Christensen, C. H.; Nørskov, J. K.; Johannessen, T. A high-density ammonia storage/delivery system based on Mg(NH3)6Cl2 for SCR-DeNOx in vehicles. Chem. Eng. Sci. 2006, 61 (8), 2618-2625.
(5) Chakraborty, D.; Petersen, H. N.; Elkjær, C.; Cagulada, A.; Johannessen, T. Solid ammonia as energy carrier: Current status and future prospects. Fuel Cells Bull. 2009, 2009 (10), 12-15.
(6) Liu, C. Y.; Aika, K.-I. Ammonia Absorption on Alkaline Earth Halides as Ammonia Separation and Storage Procedure. Bull. Chem. Soc. Jpn. 2004, 77 (1), 123-131.
(7) Wagner, K.; Malmali, M.; Smith, C.; McCormick, A.; Cussler, E. L.; Zhu, M.; Seaton, N. C. A. Column absorption for reproducible cyclic separation in small scale ammonia synthesis. AIChE J. 2017, 63 (7), 3058-3068.
(8) Sharonov, V. E.; Aristov, Y. I. Ammonia adsorption by $MgCl_2$, $CaCl_2$ and $BaCl_2$ confined to porous alumina: The fixed bed adsorber. React. Kinet. Catal. Lett. 2005, 85 (1), 183-188.
(9) Sharonov, V. E.; Veselovskaya, J. V; Aristov, Y. I. Ammonia sorption on composites "$CaCl_2$ in inorganic host matrix": isosteric chart and its performance. Int. J Low-Carbon Technol. 2006, 1 (3), 191-200.
(10) van Hassel, B. A.; Karra, J. R.; Santana, J.; Saita, S.; Murray, A.; Goberman, D.; Chahine, R.; Cossement, D. Ammonia sorbent development for on-board H2 purification. Sep. Purif. Technol. 2015, 142, 215-226.
(11) Aoki, T.; Ichikawa, T.; Miyaoka, H.; Kojima, Y. Thermodynamics on Ammonia Absorption of Metal Halides and Borohydrides. J. Phys. Chem. C 2014, 118 (32), 18412-18416.

Example 2

Rates of Ammonia Absorption and Release in Supported and Unsupported Calcium Chloride This Example shows that supporting the ammonia absorbing salt on an inert support, for example, silica or zeolite Y, can make the resulting absorbent preforms reproducibly over time and improve the stability of the absorbent. If the salt is not supported, the amount of ammonia which is absorbs can drop as the absorbent used. This Example uses the stable solid absorber described herein to replace the ammonia condenser in a conventional ammonia synthesis, where ammonia is produced at low pressure at the same rate as the conventional process, which operates at higher pressure.

Figure 9:
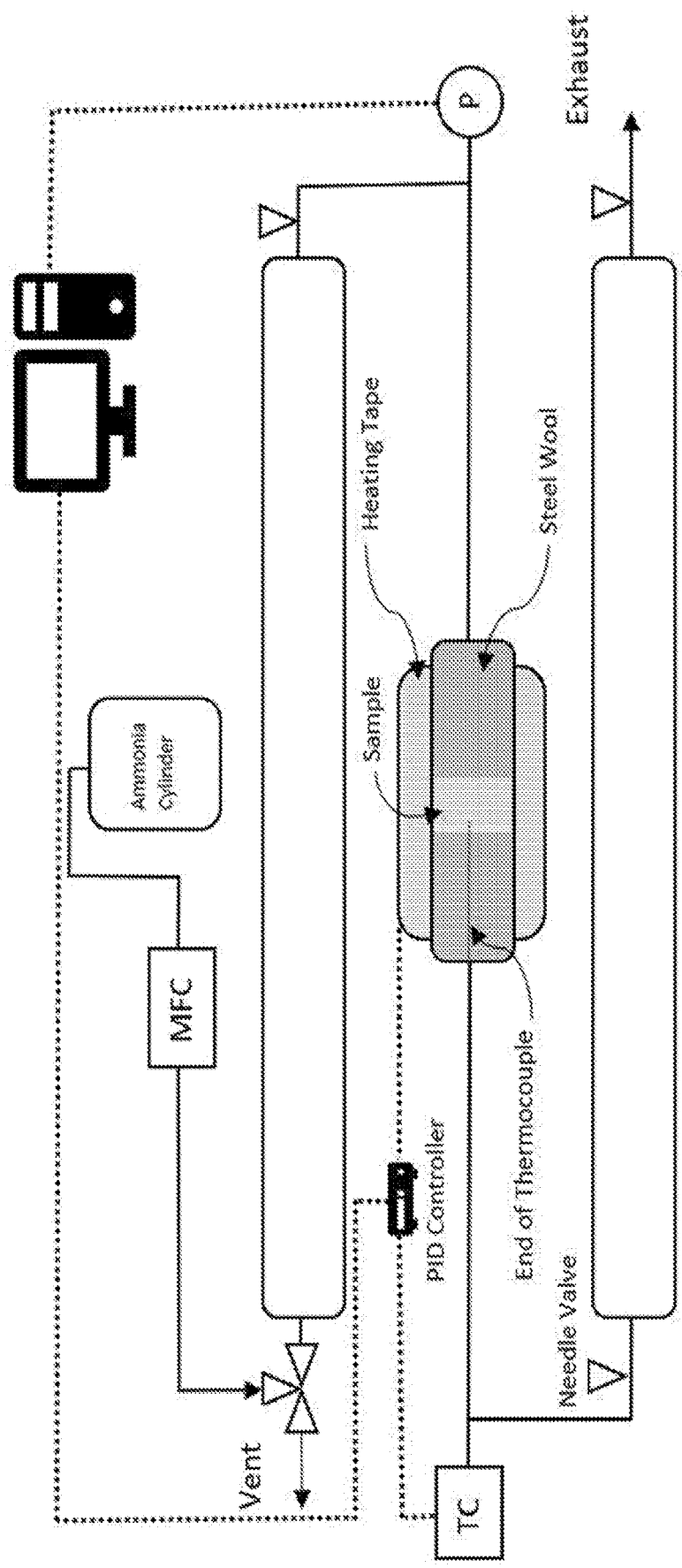
FIG. 9. Schematic of Apparatus. An absorbent is heated in a small chamber and surrounded by a large volume at ambient temperature. Pressure change indicates absorption.

Materials and Methods:

Anhydrous $CaCl_2$ in powder >97% purity (CAS No. 10043-52-4, Lot No. SLBQ3073V) was purchased from Sigma-Aldrich (St. Louis, Mo.). Anhydrous ammonia (>99.99%) was purchased from Matheson Tri-Gas (Eagan, Minn.). The experimental apparatus, as shown in FIG. 9, was built using Swagelok 316 stainless steel tubing and fittings (Chaska, Minn.). The sample chamber, 2.5 inches of half inch tubing containing 54.2 mg of $CaCl_2$ physically mixed in 2 grams of glass beads (200 micron) was retained on either side by stainless steel wool. The chamber temperature was controlled using a PID controller. An Omega K-type thermocouple (Model DRG-SC-TC) in the center of the sample chamber was utilized to measure the temperature. The chamber was connected on each side to long sections of empty tubing. Each section of tubing was separated by a Swagelok needle valve to split the system into three sections. The volumes of each section were 26, 15, and 37 cm³. The middle chamber was used in isolation to measure the equilibrium condition at any given temperature by restricting the absorbent from reaching saturation, while all three chambers were used in conjunction when measuring the kinetics of absorption. An ammonia mass flow controller (Alicat Scientific; Tuscon, Ariz/) was utilized to control the gas feed into the absorber. The PID controller and a pressure transducer (Dwyer; Michigan City, Ind.) were connected to a National Instruments CompactRio real time controller (Austin, Tex.) routed to a computer for data collection and apparatus control.

Figure 10:
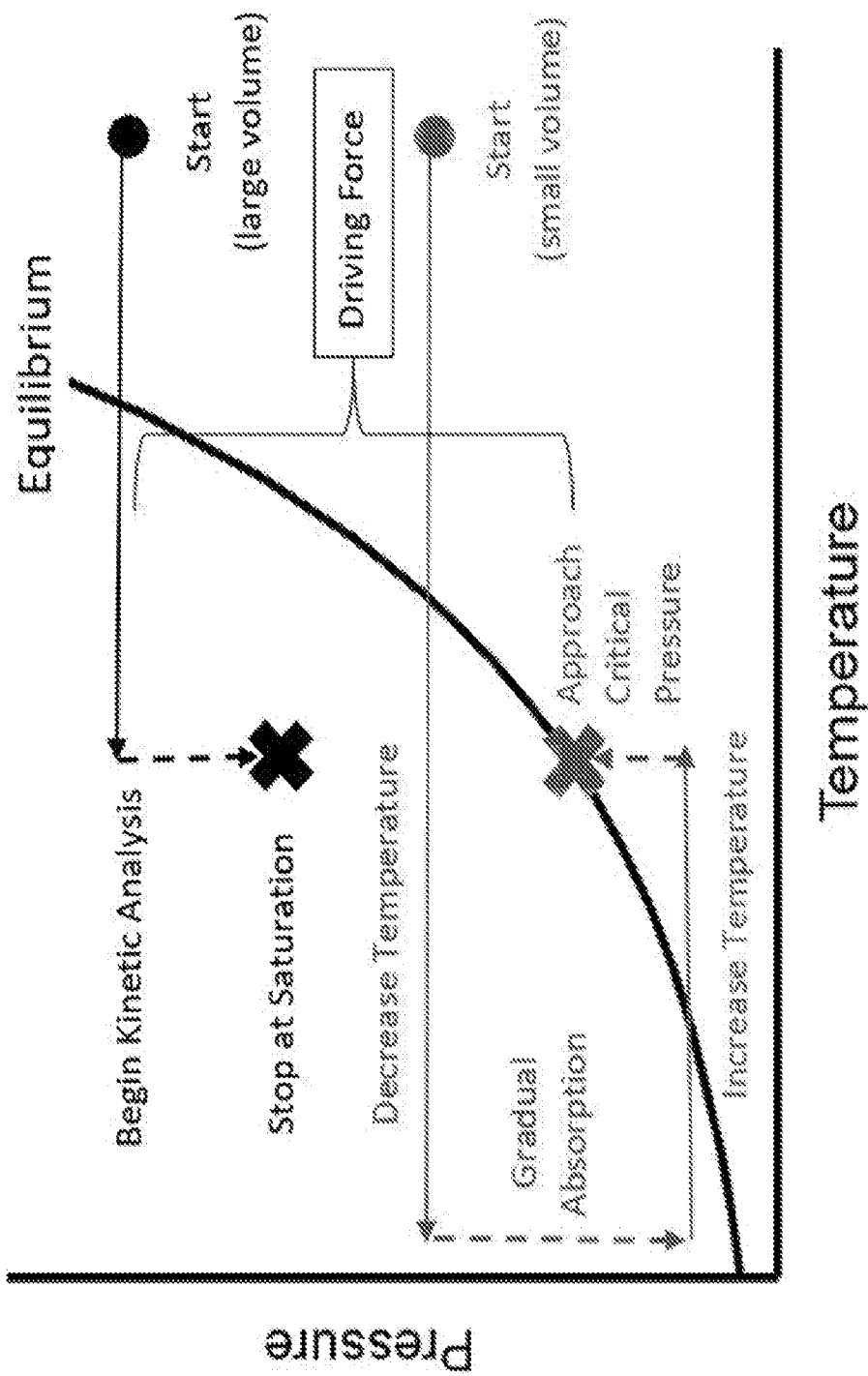
FIG. 10. Schematic of Equilibrium (Gray) and Kinetic (Black) Experiments. The goal in measuring equilibrium is to gradually approach the critical pressure while the goal in measuring kinetics is to reach saturation in a reasonable amount of time. The critical pressure is approached during the release rather than the absorption of ammonia because it was generally known that release is much faster.

General Procedure: When ammonia is absorbed into the salt, one of two conditions are generally true: either there is excess salt such that the pressure reaches the critical pressure or there is excess ammonia such that the salt reaches saturation. The first case is utilized when measuring equilibrium at any given temperature, and the second case is utilized when measuring kinetics at any given temperature and pressure. The general process for implementing these two cases are shown on the theoretical critical pressure curve in FIG. 10. The gray arrows correspond to equilibrium measurements while the black arrows correspond to kinetic measurements.

Equilibrium Measurements: To measure critical pressures below atmospheric pressure, ammonia was first purged through the system at atmospheric pressure and 20 standard cubic centimeter per minute (SCCM) with the temperature of the sample chamber at 250° C. because it is known that calcium chloride does not absorb ammonia at that temperature and pressure.[16] The mass flow controller was shut off and the valves surrounding the sample chamber, as well as the exhaust and inlet valve, were closed. So the starting point for these test was 1 bar of ammonia and 250° C. Then we exposed the absorber chamber to a controlled decrease in temperature that resulted in ammonia being absorbed and the pressure dropping.

As noted, we only used the middle section of the apparatus for this type of experiment. We designed the absorber to have a volume and ammonia partial pressure that the sample would never able to absorb one molar equivalent of ammonia; so in this type of experiment, absorbent material reached the critical pressure of formation of mono-amminated structure at the given temperature, but it never achieved a fully monoamminated structure. Since it was generally thought that release would be faster that absorption, the temperature was first decreased to 50° C. Then, it was increased incrementally until the pressure was within 21 kPa of atmospheric pressure, at which point the salt was near complete drying of ammonia and the critical pressure could not be accurately measured. For each data point reported here, the pressured was measured until it was changing by less than 0.4 kPa per hour. The final pressure achieved at each temperature was approximated to be the critical pressure at that temperature.

For critical pressures above atmospheric pressure, all three chambers were charged with ammonia (valves between chambers open) to various pressures and 250-300° C. The temperature was decreased slowly such that only one molar equivalent of ammonia would absorb. After the pressure had dropped by approximately 15 kP—indicating one mole of ammonia had been absorbed based on the total volume of the system—the valves surrounding the sample chamber were closed and the temperature was gradually increased in steps. Once the temperature increased enough for ammonia to be released, the isolated sample chamber exceeded the initial charge pressure and approached the critical pressure at a given temperature. The pressure was recorded until it was increasing by only 1 kPa per hour and the exponential decay curve was used to approximate the final equilibrium pressure. This was repeated several times.

Kinetic Measurements: To measure absorption rates, ammonia was purged though the system and the exhaust valve was closed to charge the system to a desired pressure with the sample chamber at 250-300° C. Then, the mass flow controller was shut off and the inlet valve was closed. The temperature in the sample chamber was decreased to facilitate absorption of the first mole of ammonia. The pressure was recorded to measure the kinetics of this process. This was repeated at several temperatures and initial charge pressures. The process to measure ammonia release was similar, except after absorption the temperature was increased and the return to the original pressure was measured.

Results

Figure 11:
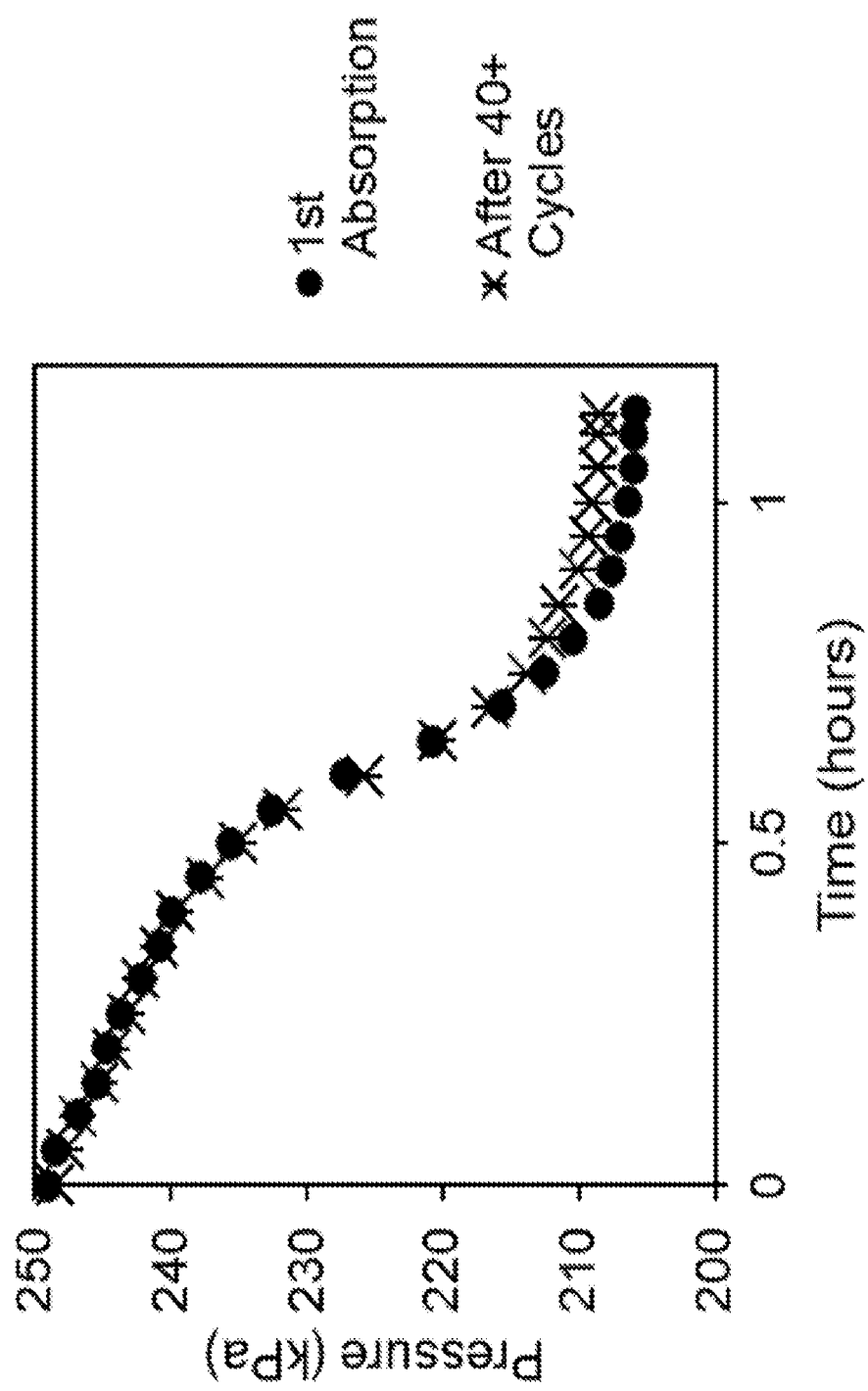
FIG. 11. Stability of Absorbent over Many Absorption Desorption Cycles. The initial lag in absorption rate is due to a lag in temperature.

Before we made our measurements of absorption and release, we check the reproducibility of the calcium chloride absorbent. This is important because earlier studies show that these materials are not always stable, especially when large amounts of pure salts are used without inert supports.[11] These instabilities often lead to capacities on the first cycle which are larger than those on, for example, the fifth cycle. This is apparently due to the salt fusing into a mass which has a smaller effective area for absorption. That this is not true for the small amounts of pure salt used here is shown by the data in FIG. 11. The rates of absorption are the same on the first cycle as they are on the fortieth cycle. The small amount of calcium chloride used here shows reproducible absorption. The BET surface area of this stable absorbent, before and after use, is a constant 9.4 $m^2$/gram.

With this proof of stability, we next report the results under three headings. First, we report equilibria at different temperatures. These temperatures determine the critical pressure ($P_e$), that is, the pressure at which an excess of gaseous ammonia produces a stoichiometric limit of absorbed ammonia per mole of salt. Second, we report ammonia release kinetics, which seem to be diffusion-controlled. Last, we measure absorption kinetics, which seem to be controlled by a first order process which may involve an initial, nucleation-like step. These results let us begin the design of the separation steps of a low-pressure ammonia synthesis, which is discussed herein.

Figure 12:
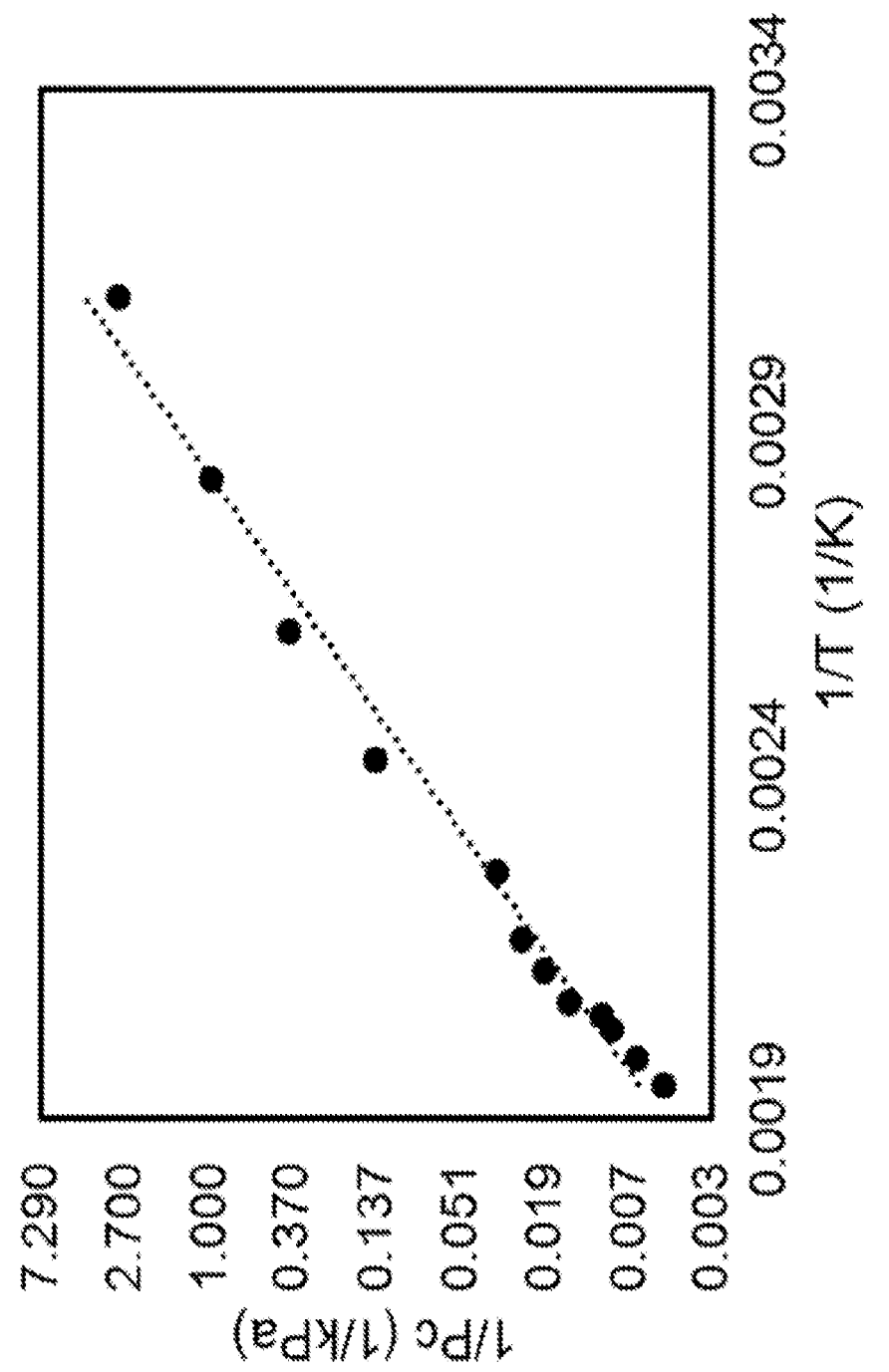
FIG. 12. Inverse of Critical Pressure vs. Inverse Temperature. The equilibrium constant for the absorption of ammonia is the inverse of the ammonia pressure because other species are solids. The slope is proportional to enthalpy of reaction and the intercept is proportional to entropy of reaction. Insert: raw data of critical pressure as a function of temperature.

Equilibrium Critical Pressure. The pressure of ammonia vs. time was reported first for cases where the system is under a pressure and temperature where ammonia release to form dried calcium chloride begins but complete release is not possible. The resulting profiles of pressure with time can be used to calculate the critical pressure for the first mole of ammonia reacting with calcium chloride to make a solid mono-amminated structure; however, the experiment's chamber volume and pressure are chosen so that the salt never reaches a fully monoamminated or fully dried structure. Since this reaction involves one gaseous species and two solid species—pure salt and amminated form—the equilibrium constant for the reaction is the inverse of the critical pressure. Plotting the natural log of the equilibrium constant against the inverse of temperature gives a straight line like that shown in FIG. 12. The slope on this plot is proportional to the enthalpy of reaction; and the y-intercept, that is, at infinite temperature, is proportional to the entropy of reaction. Table 8 shows that the values of enthalpy and entropy found here are within a factor of two of those found for similar systems in the literature.

Figure 13:
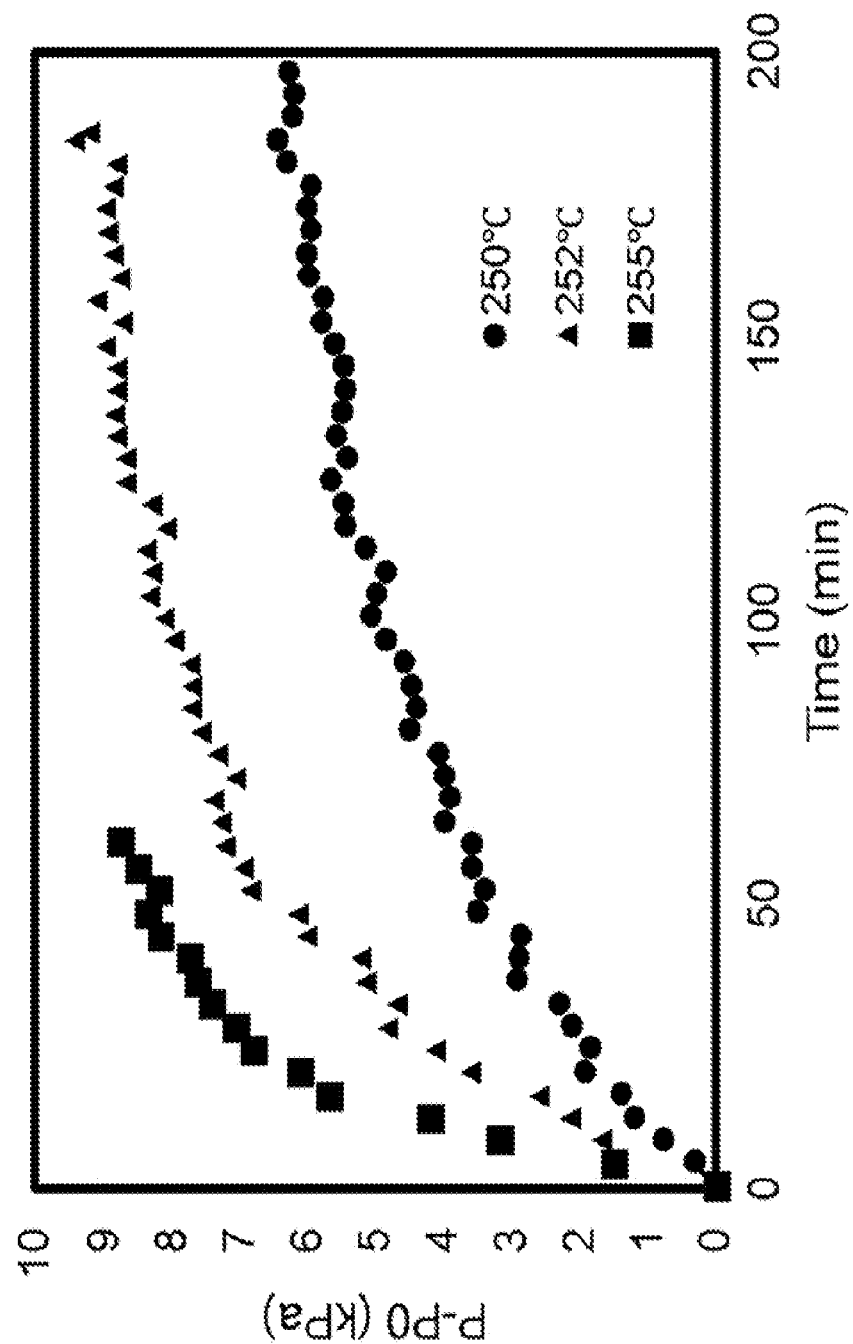
FIG. 13. Ammonia Release at 207 kPa Starting Pressure. The profiles indicate a fast initial rate and slower rate at longer times, which suggests a diffusion limitation. Complete release of ammonia is indicated by 14 kPa of pressure change.

Release Kinetics We next considered the rates of ammonia release. To study this rate, the temperature was increased such that the release starts quickly, but complete release takes much longer. This means that the pressure shows a sharp initial increase but slows with time as shown by the raw data in FIG. 13. To correlate these data more concisely, we next plot the pressure change ($P-P_0$) divided by the square root of the difference between the equilibrium pressure and the initial pressure ($P_e$-$P_0$) as is characteristic of a simplified shrinking core process. To correlate these data more concisely, we next plotted the pressure observed minus that which exists at large time; we normalized this by dividing by the initial pressure minus that which exists at large time. This new reduced pressure thus begins equal to one at time zero, and approaches zero at large times.

Figure 14:
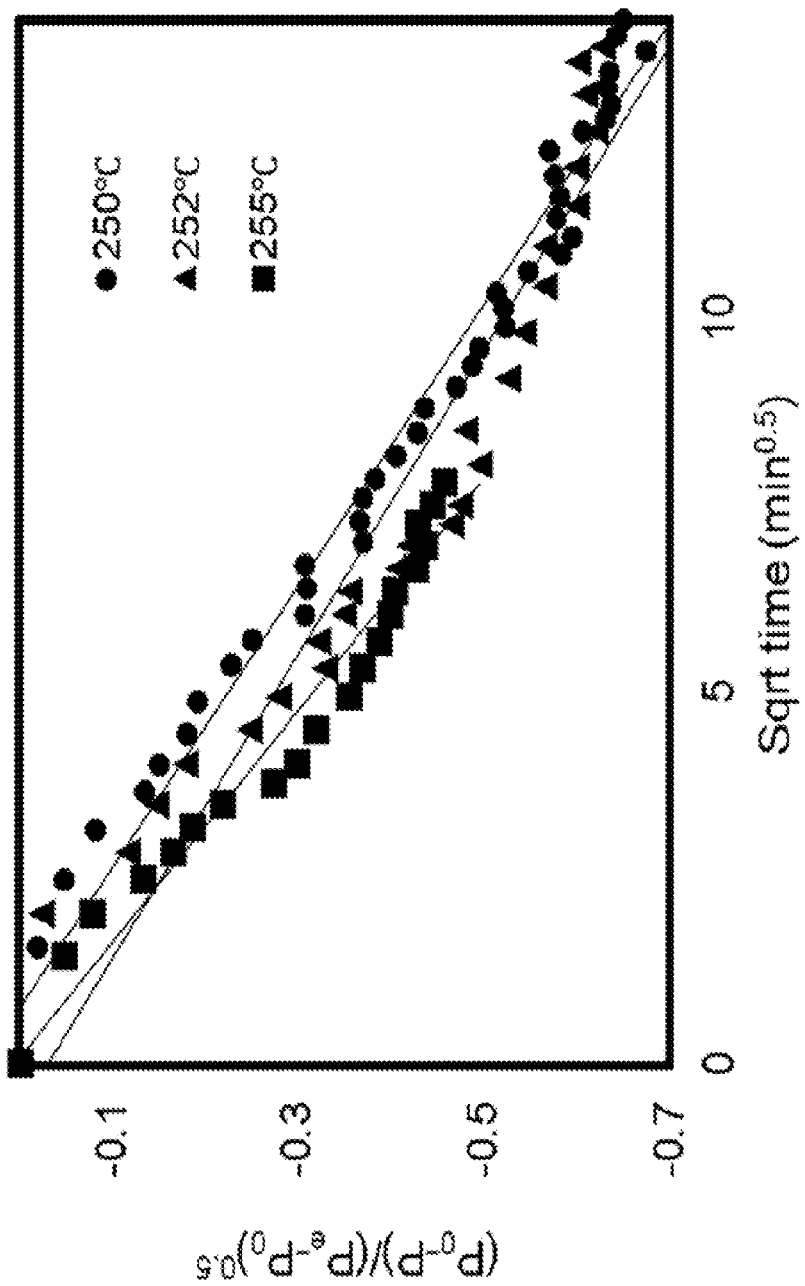
FIG. 14. Diffusion Controlled Ammonia Release Kinetics. Ammonium release kinetics with a diffusion limitation. The linearity with the square root of time is indicative of a diffusion controlled process.
Figure 15:
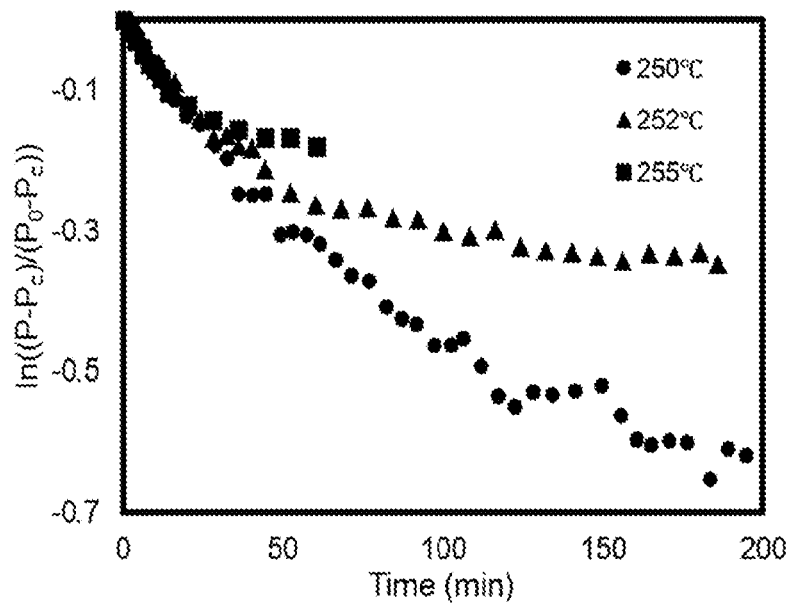
FIG. 15. First-order Ammonia Release Kinetics. Each data set was normalized to appear on the same scale. In comparison to FIG. 14, first-order kinetics is shown by nonlinearity with time.

We used this reduced pressure to explore the mechanism responsible for desorption rate of ammonia. When the reduced pressure is plotted against the normalized square root of time, the data are approximately linear, as shown in FIG. 14. Such a variation is a signature of diffusion-controlled process. In comparison, the natural log of dimensionless pressure change, as is characteristic of a first-order process, is plotted against time to the first power. The nonlinearity of the plots suggests release is not a simple first order process.

If release is in fact diffusion-controlled, the initial slope of the data in FIG. 14 is $a(4RTC_{sat}D)^{0.5}$, where a is the absorbent area per volume of gas, D is the diffusion coefficient, Csat is the concentration of ammonia in saturated salt, and T is the temperature. The data in FIG. 14 imply an average diffusion coefficient of approximately $5(\pm 1) \cdot 10^{-13}$ cm$^2$/s, two orders of magnitude smaller than that inferred from earlier measurements.[21] While we remain unsure of the precise cause of this discrepancy, we suspect that the smaller values may be due to the use of $MgCl_2$ rather than $CaCl_2$ in prior experiments.

TABLE 8

Comparison of ΔH and ΔS of the Critical Pressure
Table 8. Comparison of ΔH and ΔS of the equilibrium Pressure

| ΔH (kJ mol$^{-1}$) | ΔS (J mol$^{-1}$) | Source | Material |
|---|---|---|---|
| −51 | −105 | This work | Calcium chloride |
| −69 | −230 | Neveu 1993 | Calcium chloride |
| −43 | −132 | Sharanov 2006 | Calcium chloride |
| −69 | | Sorensen 2008 | Calcium chloride |
| −42 | −134 | Carling 1981 | Calcium chloride |
| −64 | −97 | Aoki 2015 | Magnesium chloride |

Absorption Kinetics. The dynamics of pressure change during absorption are exemplified by the raw data in FIG. 16. The absorption curves have an inflection at early times due to the time required to drop the temperature in the sample chamber. At longer times, the curves approach the same asymptote, indicative of saturation-absorbing one molar equivalent of ammonia—regardless of the temperature. To analyze these data more completely, we defined time zero for each set of conditions as the time at which the temperature reaches the set point; and we took the final time as that when the sample reaches 75% absorption. In trials where the set point temperature was low enough that absorption began before the set point is reached, time zero was defined as that when 25% absorption is reached, which we found is always less than 3° C. from the set point. This only occurred in the fastest absorption cases such as the data at 285° C. In trials where the set point was overshot by the PID controller by less than 5° C., the temperature characterizing the trial is the average of the temperature over the points analyzed. Any pressure change is thus implicitly taken to be the result of ammonia absorption rather than a decrease in the temperature of the gas in the sample chamber. This seems reasonable, because the pressure only decreases by 0.2% per 10° C. due to the properties of an ideal gas. To analyze these data, the reduced pressure was used for diffusion limitation and a dimensionless pressure for a first-order process.

Figure 16:
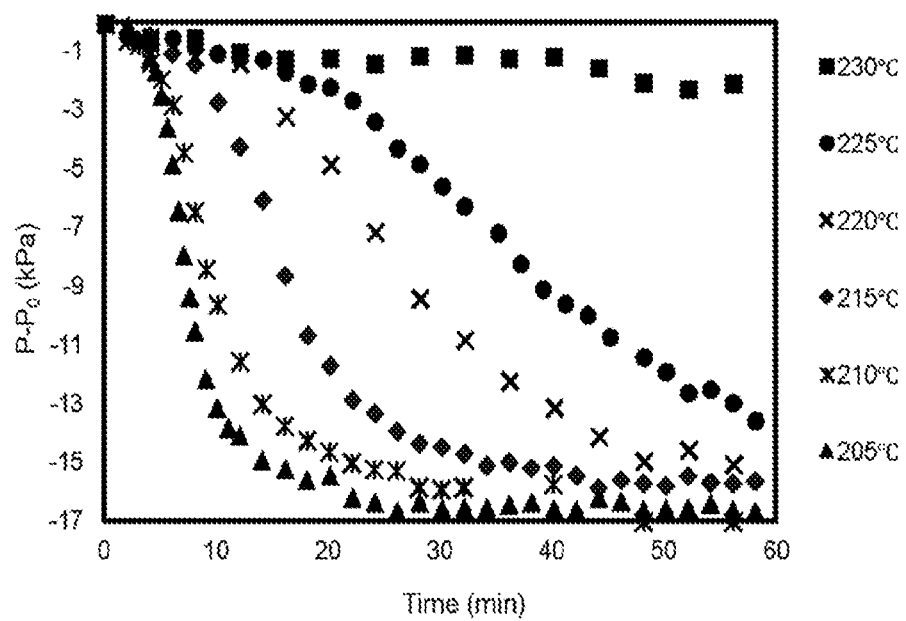
FIG. 16. Absorption Profiles at 207 kPa Starting Pressure. The initial inflection point is due to a lag in achieving the temperature set point. All profiles reach an asymptote indicative of one molar equivalent of ammonia absorbed per mole of calcium chloride based on the system volume and amount of salt.
Figure 17:
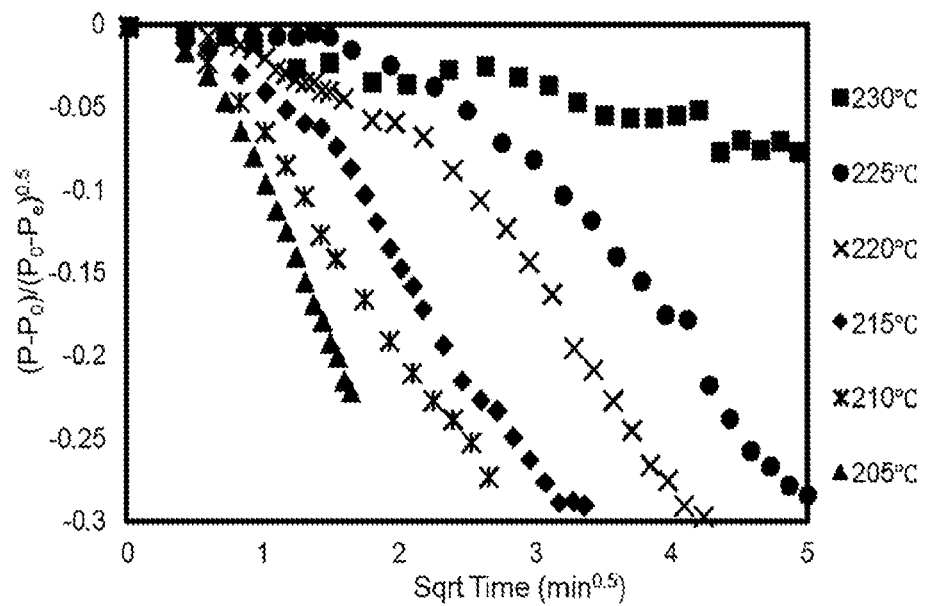
FIG. 17. Absorption kinetics with a diffusion limitation. From the data in FIG. 16, time zero is defined as the time at which the set-point is reached. Even though the profiles are linear at long times, the nonlinearities at small times suggest a lack of diffusion limitations.
Figure 18:
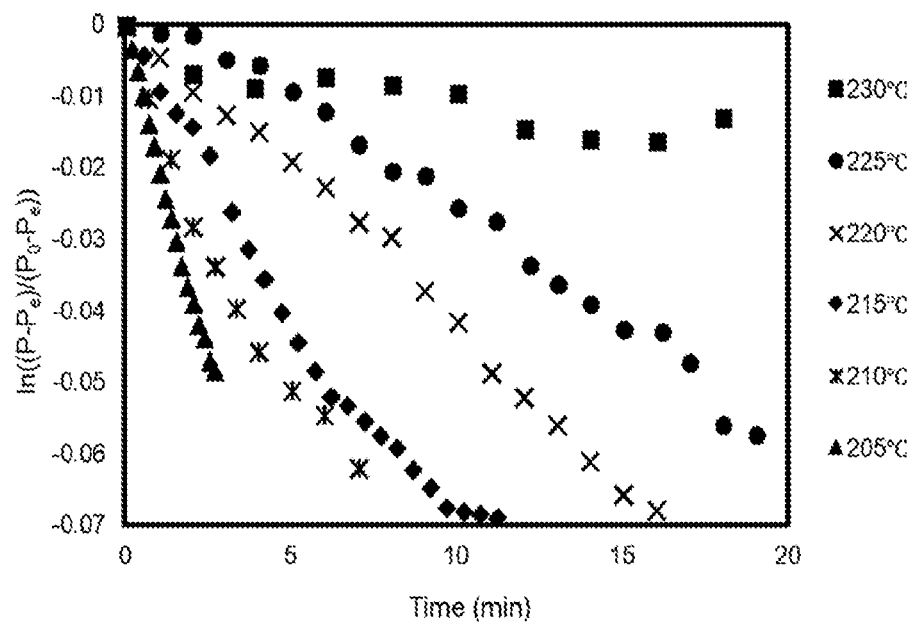
FIG. 18. First-Order Reaction Absorption Kinetics. From the data in FIG. 16, time zero is defined as the time at which the set-point is reached. All profiles indicate strong linearity relative to the nonlinearities of FIG. 17. The similarity of slope at some temperatures is due to random error.

We wanted to know if data like those in FIG. 16 are controlled by diffusion, like that for release, or by some other rate controlling step. To see if they are controlled by diffusion plotted the natural log reduced pressure vs the square root of time as shown in FIG. 17. While the data may approach linear behavior at larger time, they showed non-zero intercepts at smaller times, inconsistent with diffusion control. When we plotted the reduced pressure vs. time, the results are more nearly linear, as shown in FIG. 18. These data contradicted previous results on magnesium chloride, which concluded absorption was diffusion controlled.[21]

However, while the data in FIG. 18 suggest a first order process, the scale of the y-axis of this figure indicated that the pressure never approaches the equilibrium pressure for calcium chloride. Because the necessary driving force for appreciable absorption, observed to be approximately 69 kPa, is far from the equilibrium pressure at any given temperature, the driving force for the absorption does not decrease as absorption proceeds. Once saturation is reached, the equilibrium pressure will change to the current pressure so the driving force becomes zero. Therefore, FIG. 18 does not remove the possibility of a higher order reaction, as has been observed in a number of other systems.[22]

Because the absorption is highly exothermic as is shown in Table 8, transferring heat away from the particle is also a concern. We believe that heat transfer in the particle is fast relative to conductive heat transfer away from the particle. To support this belief, we note that a typical absorption in these experiments took 30 minutes and released 0.11 W of energy if an upper estimate of 69 kJ per mole is assumed for the enthalpy of reaction. The calcium chloride absorbent has a particle size of approximately 200 μm, as measured under a light microscope. This corresponds to a surface area of 0.001 m$^2$/g, which is 300 times less than the BET surface area. The heat transfer coefficient of ammonia gas is around 40 W m$^{-2}$K$^{-1}$, as estimated using a thermal conductivity of 0.04 W m$^{-1}$K$^{-1}$[23] and an overestimated distance of 1 mm between the absorbent particle and either a glass particle or the stainless-steel chamber. Using these estimates, the temperature rise in the particle was estimated to be only 3° C. In the case of the fastest reaction experiment, the temperature rise was estimated to be 18° C. Therefore, while heat transfer limitations may be significant under fast reaction conditions, they are insignificant under slower reaction conditions. Since the rate behavior under slow conditions is the same as it is under fast conditions, we conclude that heat transfer limitations are not important here.

Thus, the results above suggest that the rate controlling step for release is diffusion, but the rate of absorption depends more on the detailed chemistry. The implications of this result for the low-pressure synthesis of ammonia using absorption are discussed in greater detail in the next section.

Discussion

The data above lead to two ideas which merit discussion. The first, more scientific idea concerns the mechanism of ammonia movement into and out of calcium chloride. The second, more practical concern is the basis which these experiments provide for designing alternative ways to make ammonia. Each idea is discussed here.

The data above show that ammonia release from calcium chloride is diffusion controlled, and that ammonia uptake reaction controlled. However, these data do not identify the particular chemistry involved. To show this, we first consider release. If the calcium chloride is homogeneous, then the probable mechanism involves a shell of calcium chloride surrounding a core of $CaCl_2.2NH_3$. The release then could involve the rapid decay of $CalC_2.2NH_3$ into pure $CaCl_2$ and free $NH_3$ ammonia; the free ammonia then slowly diffuses out from a core of complex to the surrounding gas. If the ammine salt was opaque and the salt clear, a cross section would show an opaque core and a clear shell. This would give the observed dependence of release on the square root of time. Alternatively, if the calcium chloride were not homogeneous but nanoporous, the ammonia could be quickly released within the solid, and slowly diffuse to the walls of the pores. This would also explain the rate varying with the square root of time. Now, if the ammine were opaque, we would see gradations in the opaque of the solid. This would also explain the rate varying with the square root of time. Without more measurements of ammonia distribution within the absorbent, we cannot be sure of the detailed mechanism of release.

In a similar sense, we cannot identify all details of the mechanism of absorption. The data for absorption are slower than for release, consistent with the hypothesis that diffusion is not rate controlling. The data do show the characteristic behavior of a first order reaction, but requires a large distance from equilibrium. This may be correlated by a higher order reaction, as high as seventh order as discussed and shown in FIG. 19. Alternatively, it could suggest some sort of nucleation event, perhaps a formation of an intermediate cluster of ammoniated $CaCl_2$ nucleated on solid $CaCl_2$. After this cluster formation, the addition of an additional $NH_3$ causes the solid ammine crystal complex to form at a rate that is not limited by the transport of ammonia through the complex. However, we recognize that such behavior frequently occurs in catalytic systems, and we have no direct evidence about the chemistry responsible. For now, we only want to point to the type of complexity which must be involved.

The second, more practical idea derived from the data above concerns the implications for small scale ammonia synthesis, which is the origin of this project. In particular, the results can guide speculation about the feasibility of an ammonia synthesis in which ammonia absorption by calcium chloride replaces ammonia condensation. We already know that such a process can give greater ammonia synthesis rates at least seven times lower pressure. We know that the capital of the absorbent process will be lower because less metal is needed for the lower pressure reactor and separator, and because the lower pressure means that the compressor needs less energy. We also know how to stabilize the ammonia selective absorbents[10-11], and which absorbent chemistries promise better performance.

These data suggest two important aspects of absorbent operation. First, we now know the times required for absorption and release, which affect the size and expense of the absorber operation. Second, we can now estimate the specific conditions which will give the best absorber performance. These two aspects are explored further below.

We first consider absorbent cycle times. In Table 9A, we list the half-lives at 207 kPa for the absorption of one molar equivalent of ammonia vs. the temperature and the distance from equilibrium, calculated using the critical pressure. In Table 9B, we give the half-lives for release of one molar equivalent of ammonia at 209 kPa and various temperatures. The absorption half-lives indicate that absorption proceeds slowly at small distances from equilibrium, but increases rapidly before reaching a plateau at larger distances from equilibrium. This stands in stark contrast to the release rates, where only a distance of 21 kPa from equilibrium is required for the same rate as absorption at a distance of 103 kPa from equilibrium.

Figure 20:
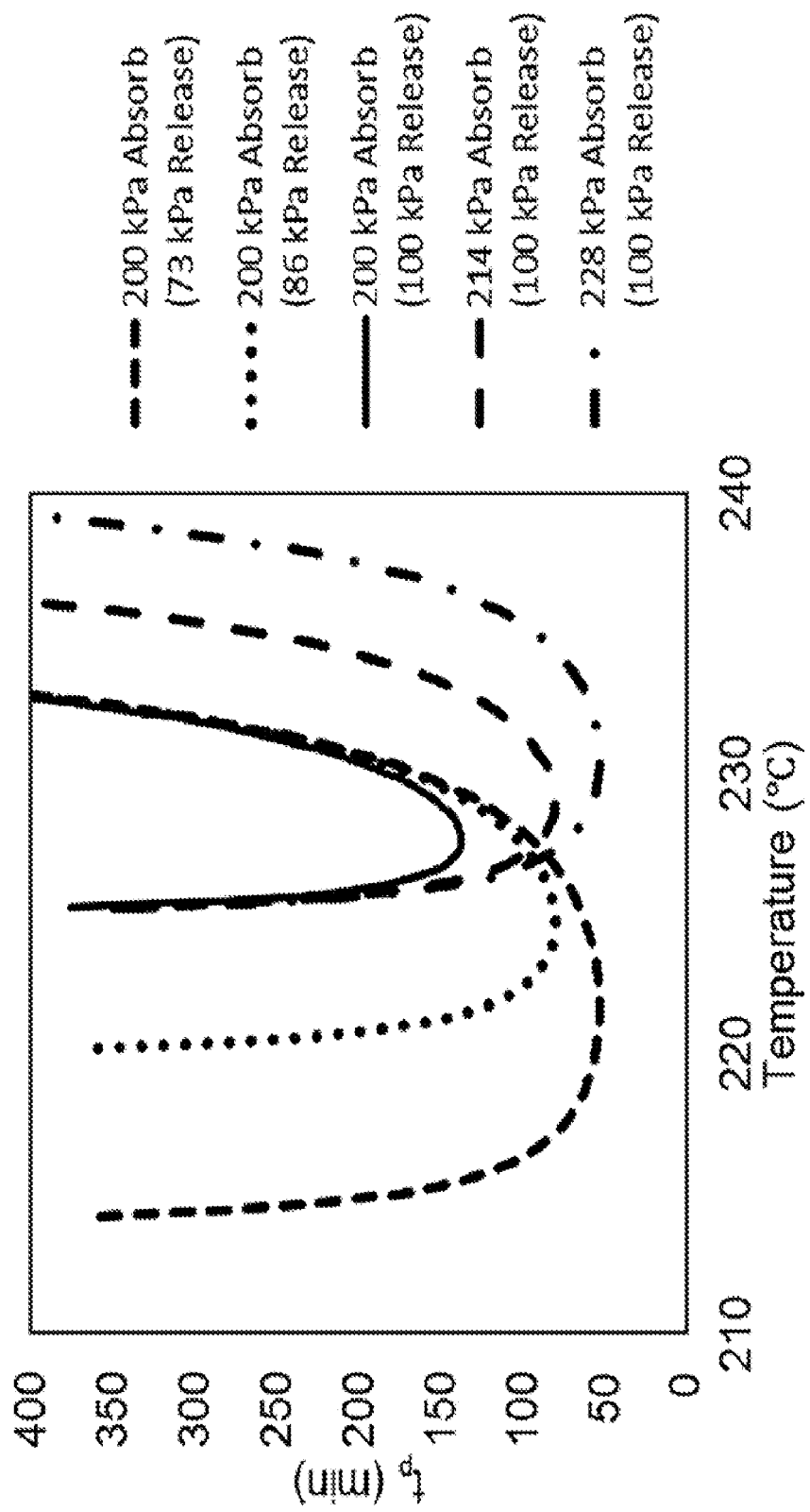
FIG. 20. Process Sensitivity with Temperature at Several Absorption/Release Conditions. The overall process time ($t_p$) is minimized at optimal conditions. The high temperature asymptote is due to absorption being very slow and the low temperature asymptote is due to release being very slow. The overall process time ($t_p$) decreases by the same amount if the absorption pressure is increased or the release pressure is decreased.
Figure 21:
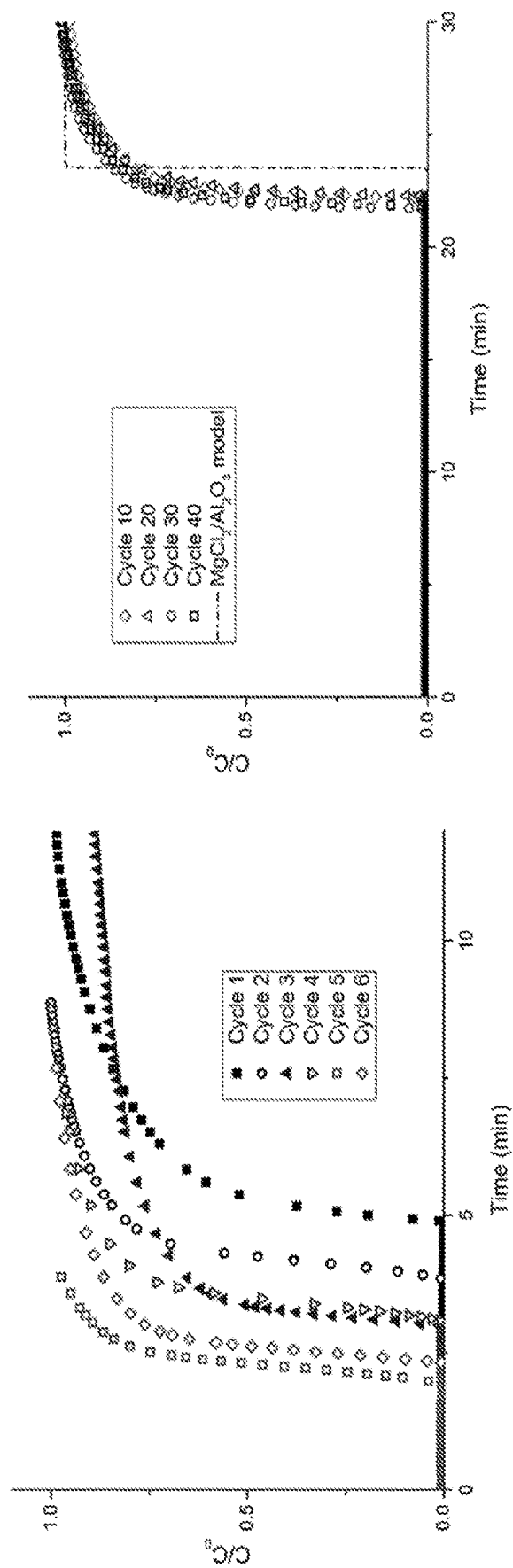
FIG. 21 illustrates decay in absorbent capacity. The concentration of ammonia in a gas mixture flowing out of the bed is plotted vs. time.

This decay in absorbent capacity is illustrated by the data in FIG. 20. The figure reports the concentration of ammonia diluted by gases like nitrogen and hydrogen flowing through a packed bed of absorbent. The concentration of ammonia in the gas mixture flowing out of the bed is plotted vs. time in the figure. Originally, the concentration coming out of the bed is zero: the absorbent is capturing all the ammonia flowing in. Later, the ammonia concentration coming out rises, eventually reaching the concentration flowing into the bed. The time at which this concentration changes is a measure of the capacity of the bed: a larger time means that more ammonia is captured.

The data on the left of FIG. 20 report the performance of a bed made of pure salt. As the figure shows, the bed has a breakthrough time of around 5 min the first time the bed is used. However, after 5-6 cycles, the time, and hence the bed's capacity, is under three minutes, so the bed's capacity has dropped 40%. In contrast, the data on the right-hand side of FIG. 20 show that for salt supported by silica, the capacity is unchanged even after 40 cycles. The supported absorbent is much more stable, and hence much more practically useful.

TABLE 9

Table 9.
Kinetics of Ammonia Interactions with Calcium Chloride

| A|Absorption at 207 kPa | | | | | | | | | |
|---|---|---|---|---|---|---|---|---|---|
| Temperature (° C.) | 238 | 235 | 232 | 225 | 220 | 215 | 210 | 205 | 195 |
| Distance from equil (kPa) | 62 | 76 | 90 | 110 | 124 | 138 | 145 | 152 | 165 |
| Half-life (min) | 1700 | 670 | 300 | 21 | 15 | 8 | 6 | 4 | 3 |

| B|Release at 207 kPa | | |
|---|---|---|
| Temperature (° C.) | 250 | 252 | 255 |
| Distance from equil (kPa) | 7 | 20 | 41 |
| Half-life (min) | 75 | 30 | 10 |

Figures 19A, 19B:
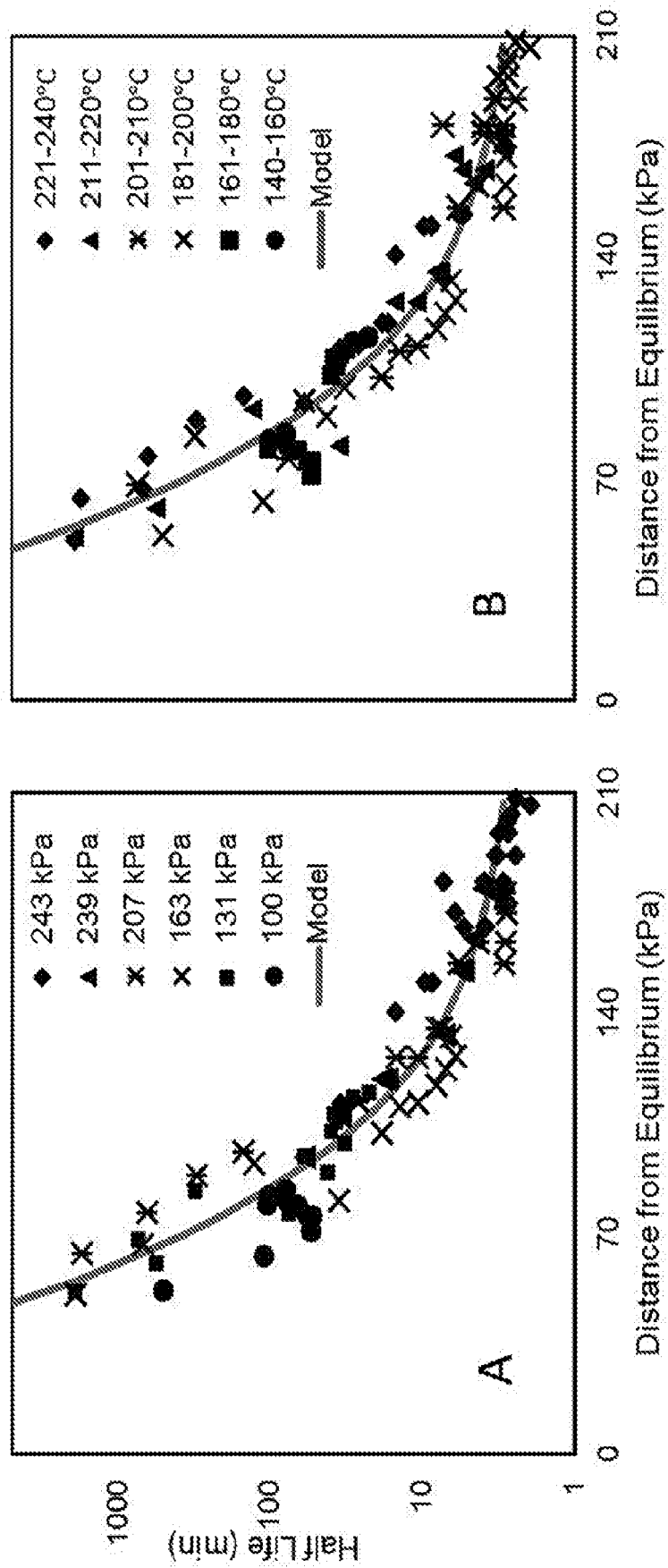
FIGS. 19A and 19B. Summary of All Absorption Data Half-Lives. The rate of absorption is dependent only on the distance from equilibrium. The model (Equation 1) is higher order at small distances from equilibrium, which suggests a nucleation event. At large distances from equilibrium, the model is first-order. Whether the data is grouped by starting pressure (A) or temperature (B), the only trend is with the distance from equilibrium.

This general trend in the rate of absorption requiring large distances from equilibrium similarly appears when the half-life is plotted against the distance from equilibrium at various starting pressures, as shown in FIG. 19A, or at various temperatures, as shown in FIG. 19B. Temperature are represented in a range because the absorption temperature was not the same for different starting pressure. The trend strongly indicates that the distance from equilibrium, rather than the temperature or pressure, is the independent variable in the rate of ammonia absorption. The model used to capture this trend, as shown in FIG. 19, is a rate equation that is seventh order at small distances from equilibrium and first order at large distances from equilibrium.

For the purpose of process sensitivity analysis, the sum of the half-life for absorption and the half-life for release is defined as the process time $t_p$. The half-life for absorption is calculated from model picture in FIG. 19 and the half-life for release is calculated using a simple inverse relation with distance from equilibrium that reflects the data in Table 9B. This process time $t_p$ is the inverse of the combined rate of absorption and release, which is to be optimized by changing the absorption and release conditions. Since the process will always become faster as the absorption and release pressure are independently increased and decreased, respectively, the temperature is the most useful sensitivity parameter. For simplicity, it is assumed that absorption and release occur at the same temperature. As a starting point, it is assumed the absorption pressure is 200 kPa (twice atmospheric pressure) and the release pressure is 100 kPa (atmospheric pressure). As shown by the solid line in FIG. 20, there is a temperature at which the overall process time is at a minimum. The asymptote at higher temperature is due to the absorption becoming very slow and the asymptote at lower temperature is due to the release becoming very slow.

With this as a base case, the effect of increasing the absorption pressure or decreasing the release pressure on the overall process time is examined. As shown in FIG. 19, as the absorption pressure increases, the optimal temperature increases as the higher temperature asymptote shifts. Conversely, as release pressure decreases, the optimal temperature decreases as the lower temperature asymptote shifts. In either case, the overall rate of the process, and the individual rates of absorption and release, increase by the same amount whether the absorption pressure increases or the release pressure decreases, as shown in Table 10. This indicates that the absorption and release are fundamentally connected. For example, as the absorption pressure increases, the process temperature can be increased, which improves the rate of release.

TABLE 10

Design Parameters from the Minimum Process Time ($t_p$) in FIG. 19
Table 10. Design Parameters from the Minimum Process Time ($t_p$) in FIG. 12

| Absorption pressure [release pressure] (kPa) | Optimized temperature (° C.) | Rate of absorption $10^{-5}$ mol/(min g) | Release half-life (min) |
|---|---|---|---|
| 200 [73] | 222 | 15.7 | 27 |
| 228 [100] | 231 | 15.4 | 27 |
| 214 [100] | 229 | 9.5 | 38 |
| 200 [100] | 227 | 5.0 | 57 |

If the case of 228 kPa absorption and 100 kPa release is taken as the design, the absorber temperature would be 231° C. In order to uptake the equivalent of 1 kg of ammonia per day, 260 g of calcium chloride is necessary with a rate of $15.4 \cdot 10^{-5}$ mole min$^{-1}$ g$^{-1}$. The absorption cycle time would be 60 min; the release cycle time would be 60 min; and the overall pressure would be 4560 kPa in order to reach a partial ammonia pressure of 228 kPa assuming 5% ammonia in the reactor effluent. It is important to note that this analysis does not consider the decrease in absorption rate that would occur as the ammonia pressure would decrease with distance through the absorber. However, this is not crucial to the process, because as long as the catalyst is not poisoned by a significant recycle of ammonia these operating conditions will still be feasible.

There are two general conclusions that are drawn from this optimization. The first is that increasing the absorption pressure or decreasing the release pressure will have an equal effect on improving the process, and the practical route should depend only on equipment considerations. For example, if a vacuum for release needs to be avoided, this can be mitigated by simply increasing the absorption pressure. Secondly, if a reactor and absorber at isothermal conditions is the goal, the overall pressure will need to be increased in order for the absorption to occur at a significant rate. The target pressure has been set as low as 2000 kPa so that compression costs are minimized. However, unless an absorbent that can absorb ammonia at an appreciable rate at a higher temperature is found, this target will need to be conceded for the sake of removing the equilibrium limitations of the ammonia synthesis reaction.

Example 3

Absorption and Desorption Kinetics

To be effective, the absorber must take up and release ammonia quickly, within a few minutes. This is important because ammonia diffusion in solids has been presumed to be slow, so that a separation process based on transport into solids will not be practical. That this is not the case is shown by the data which follow.

To study rates of ammonia release, the temperature of an ammonia containing salt was increased such that the release starts quickly, but complete release takes much longer. To study rates of ammonia absorption, the temperature of an absorbent without ammonia was suddenly exposed to an ammonia containing gas, and the resulting drop in ammonia pressure was recorded. In both cases, the resulting pressure changes can be analyzed as a half-life, the time required for the pressure change to go halfway from its original value to the new value at very long time. Such a half-life seems a simple way to gage the speed with which the absorber can operate.

The half-lives observed in these experiments are exemplified by the results in Table 9. These data suggest conditions under which the absorber can be operated. More helpfully, the show that the overall absorption times can be made comparable with the reaction times by adjusting the absorber size. This suggests strategies for more practical designs. Some of these are detailed in Table 10.

REFERENCES (Examples 2 and 3)

1.
2. Klerke, A.; Christensen, C. H.; Nørskov, J. K.; Vegge, T. Ammonia for Hydrogen Storage: Challenges and Opportunities. *J. Mater. Chem.* 2008, 18, 2304.
3. Shaden Mohammad H. Daghash, The Carbon Footprint of Ammonia Process—Case Study on Utilization of Natural Gas & Environmental Sustainability, *Advances in Gas Processing*, 2012, Volume 3, Pages 94-101
4. Michael Reese, Cory Marquart, Mandi Malmali, Kevin Wagner, Eric Buchanan, Alon McCormick, and Edward L. Cussler, Performance of a Small-Scale Haber Process, *Industrial & Engineering Chemistry Research* 2016 55 (13), 3742-3750.
5. Dyson, D. C.; Simon, J. M. Kinetic Expression with Diffusion Correction for Ammonia Synthesis on Industrial Catalyst. *Ind. Eng. Chem. Fundam.* 1968, 7, 605.
6. Temkin, M.; Pyzhev, V. Kinetics of Ammonia Synthesis on Promoted Catalysts. *Acta Physiochim. USSR* 1940, 12, 327.
7. Annable, D. Application of the Temkin Kinetic Equation to Ammonia Synthesis in Large-Scale Reactors. *Chem. Eng. Sci.* 1952, 1, 145.
8. Horiuti, J.; Takezawa, N. The Mechanism of Catalyzed Synthesis of Ammonia in the Presence of Doubly Promoted Iron Catalyst. *J. Res. Inst. Catal., Hokkaido Univ.* 1960, 170-187.
9. Mandi Malmali, Yongming Wei, Alon McCormick, and Edward L. Cussler, Ammonia Synthesis at Reduced Pressure via Reactive Separation, *Industrial & Engineering Chemistry Research* 2016 55 (33), 8922-8932
10. ACS Sustainable Chemistry (submitted).

11. Wagner et. al. Column Absorption for Reproducible Cyclic Separation in Small Scale Ammonia Synthesis, *AIChE Journal*. July 2017 Vol. 63, No. 7. Pages 3058-3068.
12. Aribike, D. S. & Olafadehan, O. A. *Theor Found Chem Eng* (2008) 42: 257.
13. Andrew R. Teixeira, Chun-Chih Chang, Wei Fan, Paul J. Dauenhauer, Dominance of Surface Barriers in Molecular Transport through Silicalite-1, *Journal of Physical Chemistry C* 2013, 117(48), 25545-25555.
14. Lis Marcussen. The Kinetics of Water Adsorption on Porous Alumina," *Chemical Engineering Science*, Volume 25, Issue 9,1970, Pages 1487-1499.
15. Yuri I. Aristov et al, Kinetics of Water Adsorption on Silica Fuji Davison R D, *Microporous and Mesoporous Materials*, Volume 96, Issues 1-3, 2006, Pages 65-71.
16. Z Sorensen, Rasmus & S Hummelshoj, Jens & Klerke, Asbjorn & Birke Reves, Jacob & Vegge, Tejs & K Norskov, Jens & H Christensen, Claus. (2008). Indirect, Reversible High-Density Hydrogen Storage in Compact Metal Ammine Salts. *Journal of the American Chemical Society.* 130. 8660-8.
17. P. Neveu and J. Castaing, Heat Recovery Syst. CHP, 13, 233 (1993).
18. Sandler, Stanley. *Chemical, Biochemical, and Engineering Thermodynamics*. John Wiley & Sons, 2006. ed. 4. pp 738.
19. E. Sharonov, Vasily & Veselovskaya, Janna & Aristov, Yuri. (2006). Ammonia sorption on composites 'CaCl 2 in inorganic host matrix': isosteric chart and its performance. *International Journal of Low-carbon Technologies.* 1. 191-200.
20. Z Sorensen, Rasmus & S Hummelshoj, Jens & Klerke, Asbjorn & Birke Reves, Jacob & Vegge, Tejs & K Nørskov, Jens & H Christensen, Claus. (2008). Indirect, Reversible High-Density Hydrogen Storage in Compact Metal Ammine Salts. *Journal of the American Chemical Society.* 130. 8660-8.
21. Aoki, Taihei & Miyaoka, Hiroki & Inokawa, Hitoshi & Ichikawa, Takayuki & Kojima, Yoshitsugu. (2015). Activation on Ammonia Absorbing Reaction for Magnesium Chloride. *The Journal of Physical Chemistry C.* 119.
22. Huberty, M. S., Wagner, A. L., McCormick, A. and Cussler, E. (2012), Ammonia absorption at haber process conditions. *AIChE J.,* 58: 3526-3532.
23. Rutherford Aris, Gianni Astarita, Continuous lumping of nonlinear chemical kinetics, *Chemical Engineering and Processing: Process Intensification*, Volume 26, Issue 1, 1989, Pages 63-69.
24. R. Afshar, S. Murad & S. C. Saxena, Thermal Conductivity of Gaseous Ammonia in the Temperature Range 358-925 K, *Chemical Engineering Communications*, Volume 10, Iss. 1-3, 1981.
25. Jaroslav Nývlt, Kinetics of nucleation in solutions, *Journal of Crystal Growth, Volumes* 3-4, 1968, Pages 377-383.

Each publication, patent, and patent publication cited in this disclosure is incorporated in reference herein in its entirety. The present invention is not intended to be limited to the foregoing examples, but encompasses all such modifications and variations as come within the scope of the appended claims.

The invention claimed is:

1. A system for producing ammonia, the system comprising:
   (a) a reactor comprising a catalyst that converts at least a portion of nitrogen feed gas and at least a portion of hydrogen feed gas to ammonia ($NH_3$) forming a reaction mixture comprising the ammonia, unreacted nitrogen, and unreacted hydrogen;
   (b) an absorber configured to selectively absorb ammonia from the reaction mixture at a temperature of about 180° C. to 330° C. and a pressure of about 1-20 bar, the absorber comprising a solid absorbent, the solid absorbent comprising at least one metal halide and a solid support, wherein the solid support selected from the group consisting of silica and zeolite; and
   (c) a recycle line to recycle unabsorbed ammonium, the unreacted nitrogen, and unreacted hydrogen gas to the reactor.

2. The system of claim 1, wherein the solid absorbent comprises at least one metal halide selected from the group consisting of $MgCl_2$, $CaCl_2$, $MgBr_2$, $CaBr_2$, $MgClBr$, $CaClBr$, and $MgCaBr$.

3. The system of claim 1 or 2, wherein the solid absorbent is selected from the group consisting of $MgCl_2$—Si, $CaCl_2$—Si, $MgBr_2$—Si, $CaBr_2$—Si, $MgClBr$—Si, $CaClBr$—Si, $MgCaBr$—Si, $MgCl_2$—Ze, $CaCl_2$—Ze, $MgBr_2$—Ze, $CaBr_2$—Ze, $MgClBr$—Ze, $CaClBr$—Ze, and $MgCaBr$—Ze.

4. The system of claim 1 or 2, wherein the solid absorbent has a sorbent capacity of at least 50 mg $NH_3$/g sorbent.

5. The system of claim 1 or 2, wherein the solid absorbent has a sorbent capacity of at least 70 mg $NH_3$/g sorbent.

6. The system of claim 1 or 2, wherein the solid absorbent has a sorbent capacity of at least 100 mg $NH_3$/g sorbent.

7. The system of claim 1 or 2, wherein the solid absorbent has a sorbent capacity of at least 140 mg $NH_3$/g sorbent.

8. The system of claim 1 or 2, wherein the coordination number of the solid absorbent is at least 0.5 $mol_{NH3} \cdot mol_{salt}^{-1}$.

9. The system of claim 1 or 2, wherein the coordination number of the solid absorbent is between about 0.5 and about 2 $mol_{NH3} \cdot mol_{salt}^{-1}$.

10. The system of claim 1 or 2, wherein the ratio of metal halide to salt is from about 15:1 to about 3:4.

11. The system of claim 10, wherein the ratio of metal halide to salt is 3:2.

12. The system of claim 11, wherein the percentage of salt of the solid absorbent is about 50%.

13. The system of claim 12, wherein the percentage of salt of the solid absorbent is at least about 40%.

14. The system of claim 1 or 2, wherein the system further comprises
   (d) an absorbent control system for controlling the temperature and pressure within the absorber to modulate the absorber between an ammonium absorption phase and a desorption phase, wherein during the desorption phase the liquid ammonia is separated from the unabsorbed ammonia gas and the unreacted nitrogen and hydrogen gas.

15. The system of claim 14, wherein the absorption phase comprises a temperature of about 180° C. to 300° C. within the absorber and a pressure from about 1 to about 5 bar.

16. The system of claim 1 or 2, wherein the system further comprises a heat exchanger, wherein the heat exchanger is able to regulate the temperature of the reaction mixture.

17. The system of claim 1 or 2, wherein the system does not comprise a condenser in order to separate the liquid ammonia from the reaction mixture.

18. The system of claim 1 or 2, wherein the system further comprises a compressor, the compressor comprising an inlet for the nitrogen feed gas, and inlet for the hydrogen feed gas and an inlet for the recycle line, wherein the compressor is connected to the reactor.

19. A method of producing ammonia, the method comprising
    (a) reacting a nitrogen feed gas and a hydrogen feed gas in the presence of a catalyst in a reactor to form ammonia ($NH_3$), wherein the reaction produces a reaction mixture comprising ammonia gas, unreacted nitrogen and unreacted hydrogen,
    (b) selectively absorbing the ammonia from the reaction mixture in an absorber at a temperature of about 180-330° C. and a pressure of about 1-10 bar, the absorber comprising a solid absorbent, the solid absorbent comprising at least one metal halide and a solid support, wherein the solid support is selected from silica and zeolite; and
    (c) collecting the ammonia absorbed by the absorber into an ammonia product stream.

20. The method of claim 19, wherein the method further comprises
    (d) recycling the unabsorbed ammonium, the unreacted nitrogen and hydrogen gas from the absorber following the absorbing step (c) and providing the recycled gas to the reactor.

21. The method of claim 19 or 20, wherein step (c) comprises a step of desorbing the ammonia from the solid absorbent, wherein the desorbing comprises changing the temperature, pressure or both of the absorber to an effective temperature, pressure or both in which the ammonia is selectively desorbed from the absorbent into the ammonia product stream.

22. The method of claim 19 or 20, wherein the method further comprises in step (a)
    adding the nitrogen feed gas and the hydrogen feed gas into a system comprising:
        (i) a reactor comprising a catalyst that converts at least a portion of nitrogen feed gas and at least a portion of hydrogen feed gas to ammonia ($NH_3$) forming a reaction mixture comprising the ammonia, unreacted nitrogen, and unreacted hydrogen;
        (ii) an absorber configured to selectively absorb ammonia from the reaction mixture at a temperature of about 180° C. to 330° C. and a pressure of about 1-20 bar, the absorber comprising a solid absorbent, the solid absorbent comprising at least one metal halide and a solid support, wherein the solid support selected from the group consisting of silica and zeolite; and
        (iii) a recycle line to recycle unabsorbed ammonium, the unreacted nitrogen, and unreacted hydrogen gas to the reactor.

23. The method of claim 19 or 20, wherein the solid absorbent comprising at least one metal halide selected from the group consisting of $MgCl_2$, $CaCl_2$, $MgBr_2$, $CaBr_2$, MgClBr, CaClBr, and MgCaBr.

24. The method of claim 19 or 20, wherein the solid absorbent is selected from the group consisting of $MgCl_2$—Si, $CaCl_2$—Si, $MgBr_2$—Si, $CaBr_2$—Si, MgClBr—Si, CaClBr—Si, MgCaBr—Si, $MgCl_2$—Ze, $CaCl_2$—Ze, $MgBr_2$—Ze, $CaBr_2$—Ze, MgClBr—Ze, CaClBr—Ze, and MgCaBr—Ze.

25. The method of claim 19 or 20, wherein the solid absorbent has a sorbent capacity of at least 50 mg $NH_3$/g sorbent.

26. The method of claim 19 or 20, wherein the solid absorbent has a sorbent capacity of at least 70 mg $NH_3$/g sorbent.

27. The method of claim 19 or 20, wherein the solid absorbent has a sorbent capacity of at least 140 mg $NH_3$/g sorbent.

28. The method of claim 19 or 20, wherein the coordination number of the solid absorbent is at least 0.5 $mol_{NH3} \cdot mol_{salt}^{-1}$.

29. The method of claim 19 or 20, wherein the coordination number of the solid absorbent is between about 0.5 and about 2 $mol_{NH3} \cdot mol_{salt}^{-1}$.

30. The method of claim 19 or 20, wherein the ratio of metal halide to salt is from about 1:3 to about 3:1.

31. The method of claim 19 or 20, wherein the percentage of salt of the solid absorbent is at least about 40%.

32. The method of claim 31, wherein the percentage of salt of the solid absorbent is about 50%.

* * * * *